(12) United States Patent
Long et al.

(10) Patent No.: US 11,294,839 B2
(45) Date of Patent: *Apr. 5, 2022

(54) EMULATED TELEMETRY INTERFACES FOR FABRIC-COUPLED COMPUTING UNITS

(71) Applicant: Liqid Inc., Broomfield, CO (US)

(72) Inventors: Christopher R. Long, Colorado Springs, CO (US); James Scott Cannata, Denver, CO (US); Jason Breakstone, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,000

(22) Filed: May 4, 2020

(65) Prior Publication Data
US 2020/0264998 A1    Aug. 20, 2020

Related U.S. Application Data

(63) Continuation-in-part of application No. 15/675,410, filed on Aug. 11, 2017, now Pat. No. 10,642,659.
(Continued)

(51) Int. Cl.
*G06F 13/40* (2006.01)
*G06F 13/10* (2006.01)
(Continued)

(52) U.S. Cl.
CPC ........ *G06F 13/4022* (2013.01); *G06F 9/5077* (2013.01); *G06F 13/105* (2013.01); *G06F 13/4221* (2013.01); *G06F 2213/0026* (2013.01)

(58) Field of Classification Search
CPC ............ G06F 13/4022; G06F 13/4027; G06F 13/4221; G06F 9/5077; G06F 9/5044; G06F 9/54; G06F 2213/0026
See application file for complete search history.

(56) References Cited

U.S. PATENT DOCUMENTS 5,828,207 A    10/1998 Saadeh
6,061,750 A     5/2000 Beardsley et al.
(Continued)

OTHER PUBLICATIONS

Aragon, Juan L. et al., "Control Speculation For Energy-Efficient Next-Generation Superscalar Processors," IEEE Transactions on Computers, vol. 55, No. 3, pp. 281-291, Mar. 2006.
(Continued)

*Primary Examiner* — Raymond N Phan

(57) ABSTRACT

Disaggregated computing architectures, platforms, and systems are provided herein. In one example, a method of operating compute units is presented that includes forming compute units among a plurality of physical computing components coupled over a Peripheral Component Interconnect Express (PCIe) fabric configured to communicatively couple the plurality of physical computing components and isolate the compute unit using logical partitioning within the PCIe fabric. The method also includes initiating a software component deployed to at least associated CPUs within the compute units, reporting telemetry to the management processor related to operation of the compute unit, and emulating operation of at least one among an Ethernet and InfiniBand interface to an operating system of the associated CPU for transfer of communications comprising at least the telemetry to the management processor over the PCIe fabric.

20 Claims, 14 Drawing Sheets

Related U.S. Application Data

(60) Provisional application No. 62/468,231, filed on Mar. 7, 2017, provisional application No. 62/374,573, filed on Aug. 12, 2016.

(51) Int. Cl.
*G06F 9/50* (2006.01)
*G06F 13/42* (2006.01)

(56) References Cited

U.S. PATENT DOCUMENTS

| | | |
|---|---|---|
| 6,325,636 B1 | 12/2001 | Hipp et al. |
| 7,243,145 B1 | 7/2007 | Poortman |
| 7,260,487 B2 | 8/2007 | Brey et al. |
| 7,505,889 B2 | 3/2009 | Salmonsen et al. |
| 7,606,960 B2 | 10/2009 | Munguia |
| 7,725,757 B2 | 5/2010 | Padweka et al. |
| 7,877,542 B2 | 1/2011 | Chow et al. |
| 8,125,919 B1 | 2/2012 | Khanka et al. |
| 8,150,800 B2 | 4/2012 | Webman et al. |
| 8,656,117 B1 | 2/2014 | Wong et al. |
| 8,688,926 B2 | 4/2014 | Breakstone et al. |
| 8,880,771 B2 | 11/2014 | Subramaniyan et al. |
| 9,602,437 B1 | 3/2017 | Bemath |
| 2002/0059428 A1 | 5/2002 | Susai et al. |
| 2003/0110423 A1 | 6/2003 | Helms et al. |
| 2003/0126478 A1 | 7/2003 | Burns et al. |
| 2005/0223136 A1 | 10/2005 | Tanaka et al. |
| 2006/0277206 A1 | 12/2006 | Bailey et al. |
| 2007/0067432 A1 | 3/2007 | Tarui et al. |
| 2007/0098001 A1 | 5/2007 | Thomas |
| 2008/0013448 A1* | 1/2008 | Horie ............. H04L 67/1097 370/229 |
| 2008/0034153 A1 | 2/2008 | Lee et al. |
| 2008/0198744 A1 | 8/2008 | Menth |
| 2008/0281938 A1 | 11/2008 | Rai et al. |
| 2009/0006837 A1 | 1/2009 | Rothman et al. |
| 2009/0100280 A1 | 4/2009 | Lindsay |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0276551 A1 | 11/2009 | Brown et al. |
| 2010/0088467 A1 | 4/2010 | Lee et al. |
| 2011/0289510 A1 | 11/2011 | Lin et al. |
| 2011/0299317 A1 | 12/2011 | Shaeffer et al. |
| 2011/0320861 A1 | 12/2011 | Bayer et al. |
| 2012/0030544 A1 | 2/2012 | Fisher-Jeffes |
| 2012/0089854 A1 | 4/2012 | Breakstone et al. |
| 2012/0151118 A1 | 6/2012 | Flynn et al. |
| 2012/0166699 A1 | 6/2012 | Kumar et al. |
| 2012/0210163 A1 | 8/2012 | Cho |
| 2012/0317433 A1 | 12/2012 | Ellis et al. |
| 2013/0132643 A1 | 5/2013 | Huang |
| 2013/0185416 A1 | 7/2013 | Larkin et al. |
| 2014/0047166 A1 | 2/2014 | Asnaashari et al. |
| 2014/0056319 A1 | 2/2014 | Hellwig |
| 2014/0059265 A1 | 2/2014 | Iyer et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0365714 A1 | 12/2014 | Sweere et al. |
| 2015/0026385 A1 | 1/2015 | Egi et al. |
| 2015/0074322 A1 | 3/2015 | Galles |
| 2015/0121115 A1 | 4/2015 | Chandra et al. |
| 2015/0186437 A1 | 7/2015 | Molaro |
| 2015/0212755 A1 | 7/2015 | Asnaashari |
| 2015/0304423 A1 | 10/2015 | Satoyama et al. |
| 2015/0373115 A1 | 12/2015 | Breakstone et al. |
| 2016/0197996 A1 | 7/2016 | Barton et al. |
| 2016/0248631 A1 | 8/2016 | Duchesneau |
| 2017/0054603 A1 | 2/2017 | Kulkarni et al. |

OTHER PUBLICATIONS

European Patent Application No. 17840373.9, Extended European Search Report, 9 pages, dated Feb. 18, 2020.
International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
Lu, Yingping et al., "Performance Study Of iSCSI-Based Storage Subsystems," IEEE Communications Magazine, pp. 76-82, Aug. 2003.

* cited by examiner

EMULATED TELEMETRY INTERFACES FOR FABRIC-COUPLED COMPUTING UNITS

RELATED APPLICATIONS

This application is a continuation-in-part of, and claims priority to, U.S. patent application Ser. No. 15/675,410, entitled "TELEMETRY HANDLING FOR DISAGGREGATED FABRIC-SWITCHED COMPUTING UNITS," and filed Aug. 11, 2017. This application hereby claims the benefit of and priority to U.S. Provisional Patent Application 62/374,573, entitled "DISAGGREGATED MODULAR COMPUTING PLATFORM," filed Aug. 12, 2016, and also claims the benefit of and priority to U.S. Provisional Patent Application 62/468,231, entitled "FABRIC-SWITCHED GRAPHICS PROCESSING UNIT (GPU) PLATFORM," filed Mar. 7, 2017, both of which are hereby incorporated by reference in their entirety.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

OVERVIEW

Disaggregated computing architectures, platforms, and systems are provided herein. In one example, a method of operating compute units is presented that includes forming compute units among a plurality of physical computing components coupled over a Peripheral Component Interconnect Express (PCIe) fabric configured to communicatively couple the plurality of physical computing components and isolate the compute unit using logical partitioning within the PCIe fabric. The method also includes initiating a software component deployed to at least associated CPUs within the compute units, reporting telemetry to the management processor related to operation of the compute unit, and emulating operation of at least one among an Ethernet or InfiniBand interface to an operating system of the associated CPU for transfer of communications comprising at least the telemetry to the management processor over the PCIe fabric.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
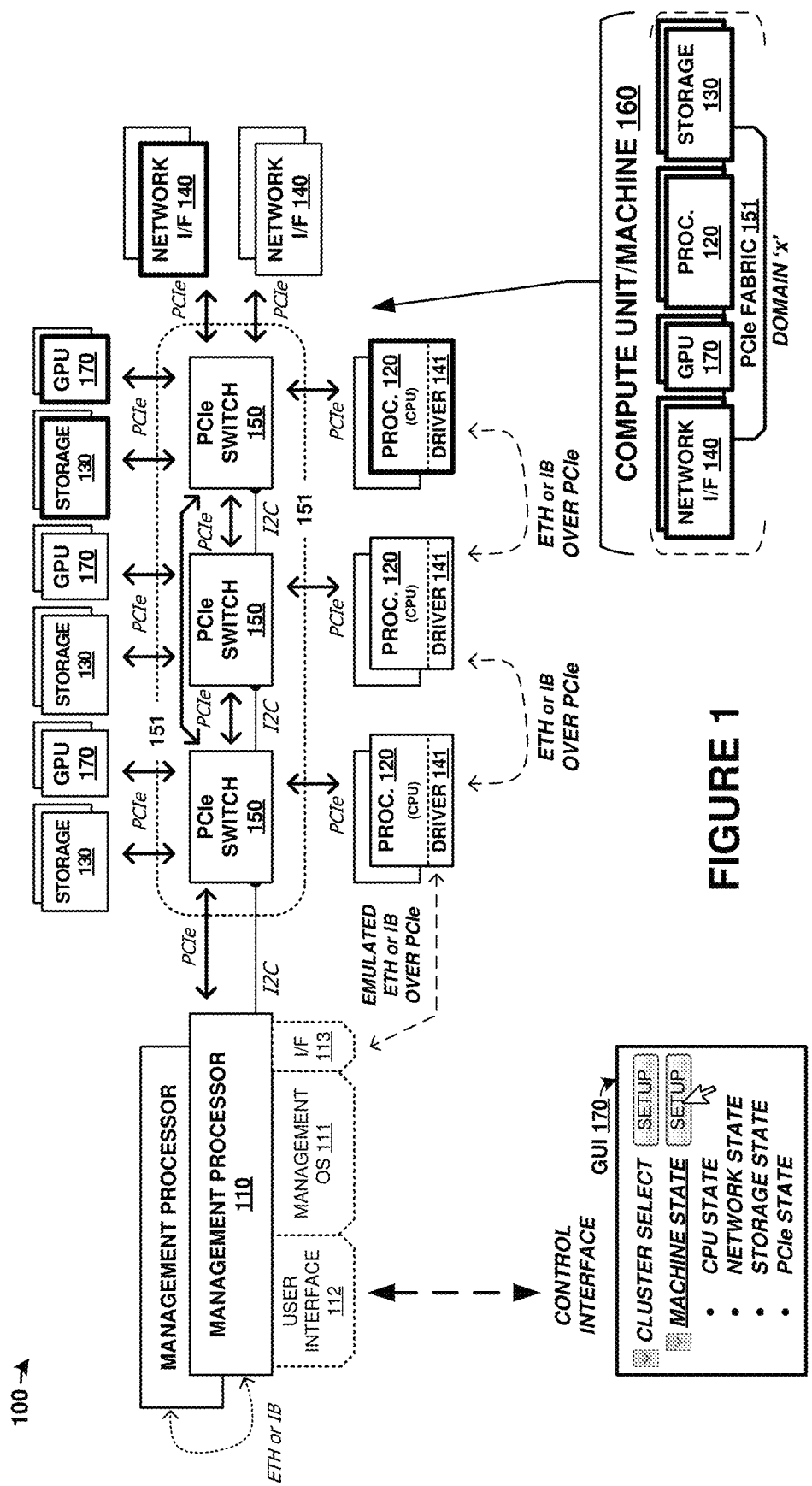
FIG. 1 is a diagram illustrating a computing platform in an implementation.

FIG. 1 is a system diagram illustrating computing platform 100. Computing platform 100 includes one or more management processors, 110, and a plurality of physical computing components. The physical computing components include CPUs of processing modules 120, storage elements 130, network elements 140, Peripheral Component Interconnect Express (PCIe) switch elements 150, and graphics processing units (GPUs) 170. These physical computing components are communicatively coupled over PCIe fabric 151 formed from PCIe switch elements 150 and various corresponding PCIe links. PCIe fabric 151 configured to communicatively couple a plurality of plurality of physical computing components and establish compute units using logical partitioning within the PCIe fabric. These compute units, referred to in FIG. 1 as machine(s) 160, can each be comprised of any number of CPUs of processing modules 120, storage units 130, network interfaces 140 modules, and GPUs 170, including zero of any module.

The components of platform 100 can be included in one or more physical enclosures, such as rack-mountable units which can further be included in shelving or rack units. A predetermined number of components of platform 100 can be inserted or installed into a physical enclosure, such as a modular framework where modules can be inserted and removed according to the needs of a particular end user. An enclosed modular system, such as platform 100, can include physical support structure and enclosure that includes circuitry, printed circuit boards, semiconductor systems, and structural elements. The modules that comprise the components of platform 100 are insertable and removable from a rackmount style of enclosure. In some examples, the elements of FIG. 1 are included in a 2U chassis for mounting in a larger rackmount environment. It should be understood that the elements of FIG. 1 can be included in any physical mounting environment, and need not include any associated enclosures or rackmount elements.

Once the components of platform 100 have been inserted into the enclosure or enclosures, the components can be coupled over the PCIe fabric and logically isolated into any number of separate compute units called "machines" or compute blocks. The PCIe fabric can be configured by management processor 110 to selectively route traffic among the components of a particular processor module and with external systems, while maintaining logical isolation between components not included in a particular processor module. In this way, a flexible "bare metal" configuration can be established among the components of platform 100. The individual compute blocks can be associated with external users or client machines that can utilize the computing, storage, network, or graphics processing resources of the compute block. Moreover, any number of compute blocks can be grouped into a "cluster" of compute blocks for greater parallelism and capacity. Although not shown in FIG. 1 for clarity, various power supply modules and associated power and control distribution links can also be included.

Turning now to the components of platform 100, management processor 110 can comprise one or more microprocessors and other processing circuitry that retrieves and executes software, such as user interface 112 and management operating system 111, from an associated storage system. Processor 110 can be implemented within a single processing device but can also be distributed across multiple processing devices or sub-systems that cooperate in executing program instructions. Examples of processor 110 include general purpose central processing units, application specific processors, and logic devices, as well as any other type of processing device, combinations, or variations thereof. In some examples, processor 110 comprises an Intel® or AMD® microprocessor, ARM® microprocessor, FPGA, ASIC, application specific processor, or other microprocessor or processing elements.

In FIG. 1, processor 110 provides interface 113. Interface 113 comprises a communication link between processor 110 and any component coupled to PCIe fabric 151. This interface employs Ethernet (ETH) or InfiniBand (IB) traffic transported over a PCIe link. Additionally, each processing module 120 in FIG. 1 is configured with driver 141 which provides for Ethernet or InfiniBand communication over PCIe links. Thus, any of processing module 120 and management processor 110 can communicate over Ethernet or InfiniBand that is transported over the PCIe fabric. A further discussion of this Ethernet or InfiniBand over PCIe configuration is discussed below.

A plurality of processing modules 120 are included in platform 100. Each processing module 120 includes one or more CPUs or microprocessors and other processing circuitry that retrieves and executes software, such as driver 141 and any number of end user applications, from an associated storage system. Each processing module 120 can be implemented within a single processing device but can also be distributed across multiple processing devices or sub-systems that cooperate in executing program instructions. Examples of each processing module 120 include general purpose central processing units, application specific processors, and logic devices, as well as any other type of processing device, combinations, or variations thereof. In some examples, each processing module 120 comprises an Intel® or AMD® microprocessor, ARM® microprocessor, graphics processor, compute cores, graphics cores, application specific integrated circuit (ASIC), or other microprocessor or processing elements. Each processing module 120 can also communicate with other compute units, such as those in a same storage assembly/enclosure or another storage assembly/enclosure over one or more PCIe interfaces and PCIe fabric 151.

A plurality of storage units 130 are included in platform 100. Each storage unit 130 includes one or more storage drives, such as solid state drives in some examples. Each storage unit 130 also includes PCIe interfaces, control processors, and power system elements. Each storage unit 130 also includes an on-sled processor or control system for traffic statistics and status monitoring, among other operations. Each storage unit 130 comprises one or more solid state memory devices with a PCIe interface. In yet other examples, each storage unit 130 comprises one or more separate solid state drives (SSDs) or magnetic hard disk drives (HDDs) along with associated enclosures and circuitry.

A plurality of graphics processing units (GPUs) 170 are included in platform 100. Each GPU comprises a graphics processing resource that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU 170 comprises a graphics 'card' comprising circuitry that supports a GPU chip. Example GPU cards include nVIDIA® Jetson cards that include graphics processing elements and compute elements, along with various support circuitry, connectors, and other elements. In further examples, other style of graphics processing units or graphics processing assemblies can be employed, such as machine learning processing units, tensor processing units (TPUs), or other specialized processors that may include similar elements as GPUs but lack rendering components to focus processing and memory resources on processing of data.

Network interfaces 140 include network interface cards for communicating over TCP/IP (Transmission Control Protocol (TCP)/Internet Protocol) networks or for carrying user traffic, such as iSCSI (Internet Small Computer System Interface) or NVMe (NVM Express) traffic for storage units 130 or other TCP/IP traffic for processing modules 120. Network interfaces 140 can comprise Ethernet or InfiniBand interface equipment, and can communicate over wired, optical, or wireless links. External access to components of platform 100 is provided over packet network links provided by network interfaces 140. Network interfaces 140 communicate with other components of platform 100, such as processing modules 120 and storage units 130 over associated PCIe links and PCIe fabric 151. In some examples, network interfaces are provided for intra-system network communication among for communicating over Ethernet or InfiniBand networks for exchanging communications between any of processing modules 120 and management processors 110.

Each PCIe switch 150 communicates over associated PCIe links. In the example in FIG. 1, PCIe switches 150 can be used for carrying user data between network interfaces 140, storage modules 130, and processing modules 120. Each PCIe switch 150 comprises a PCIe cross connect switch for establishing switched connections between any PCIe interfaces handled by each PCIe switch 150. In some examples, each PCIe switch 150 comprises a PLX Technology PEX8725 10-port, 24 lane PCIe switch chip. In other examples, each PCIe switch 150 comprises a PLX Technology PEX8796 24-port, 96 lane PCIe switch chip.

The PCIe switches discussed herein can comprise PCIe crosspoint switches, which logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by processor 110 which logically integrate components into associated compute units 160 of a particular cluster and logically isolate components and compute units among different clusters. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, storage, network) only to have visibility to those components that are included via the segregation/partitioning. Thus, groupings among a plurality of physical components can be achieved using logical partitioning among the PCIe fabric. This partitioning is scalable in nature, and can be dynamically altered as-needed by a management processor or other control elements. The management processor can control PCIe switch circuitry that comprises the PCIe fabric to alter the logical partitioning or segregation among PCIe ports and thus alter composition of groupings of the physical components. These groupings, referred herein as compute units, can individually form "machines" and can be further grouped into clusters of many compute units/machines. Physical components, such as storage drives, processors, or network interfaces, can be added to or removed from compute units according to user instructions received over a user interface, dynamically in response to loading/idle conditions, or preemptively due to anticipated need, among other considerations discussed herein.

PCIe can support multiple bus widths, such as x1, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 1, it should be understood that different communication links or busses can instead be employed, such as NVMe, Ethernet, InfiniBand, Serial Attached SCSI (SAS), Fibre-Channel, Thunderbolt, Serial Attached ATA Express (SATA Express), among other interconnect, network, and link interfaces. Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing module 120 has configurable logical visibility to any/all storage units 130 or GPU 170, as segregated logically by the PCIe fabric. Any processing module 120 can transfer data for storage on any storage unit 130 and retrieve data stored on any storage unit 130. Thus, 'm' number of storage drives can be coupled with 'n' number of processors to allow for a large, scalable architecture with a high-level of redundancy and density. Furthermore, any processing module 120 can transfer data for processing by any GPU 170 or hand off control of any GPU to another processing module 120.

To provide visibility of each processing module 120 to any storage unit 130 or GPU 170, various techniques can be employed. In a first example, management processor 110 establishes a cluster that includes one or more compute units 160. These compute units comprise one or more processing module 120 elements, zero or more storage units 130, zero or more network interface units 140, and zero or more graphics processing units 170. Elements of these compute units are communicatively coupled by portions of PCIe fabric 151. Once compute units 160 have been assigned to a particular cluster, further resources can be assigned to that cluster, such as storage resources, graphics processing resources, and network interface resources, among other resources. Management processor 110 can instantiate/bind a subset number of the total quantity of storage resources of platform 100 to a particular cluster and for use by one or more compute units 160 of that cluster. For example, 16 storage drives spanning 4 storage units might be assigned to a group of two compute units 160 in a cluster. The compute units 160 assigned to a cluster then handle transactions for that subset of storage units, such as read and write transactions.

Each compute unit 160, specifically a processor of the compute unit, can have memory-mapped or routing-table based visibility to the storage units or graphics units within that cluster, while other units not associated with a cluster are generally not accessible to the compute units until logical visibility is granted. Moreover, each compute unit might only manage a subset of the storage or graphics units for an associated cluster. Storage operations or graphics processing operations might, however, be received over a network interface associated with a first compute unit that are managed by a second compute unit. When a storage operation or graphics processing operation is desired for a resource unit not managed by a first compute unit (i e managed by the second compute unit), the first compute unit uses the memory mapped access or routing-table based visibility to direct the operation to the proper resource unit for that transaction, by way of the second compute unit. The transaction can be transferred and transitioned to the appropriate compute unit that manages that resource unit associated with the data of the transaction. For storage operations, the PCIe fabric is used to transfer data between compute units/processors of a cluster so that a particular compute unit/processor can store the data in the storage unit or storage drive that is managed by that particular compute unit/processor, even though the data might be received over a network interface associated with a different compute unit/processor. For graphics processing operations, the PCIe fabric is used to transfer graphics data and graphics processing commands between compute units/processors of a cluster so that a particular compute unit/processor can control the GPU or GPUs that are managed by that particular compute unit/processor, even though the data might be received over a network interface associated with a different compute unit/processor. Thus, while each particular compute unit of a cluster actually manages a subset of the total resource units (such as storage drives in storage units or graphics processors in graphics units), all compute units of a cluster have visibility to, and can initiate transactions to, any of resource units of the cluster. A managing compute unit that manages a particular resource unit can receive re-transferred transactions and any associated data from an initiating compute unit by at least using a memory-mapped address space or routing table to establish which processing module handles storage operations for a particular set of storage units.

In graphics processing examples, NT partitioning or domain-based partitioning in the switched PCIe fabric can be provided by one or more of the PCIe switches with NT ports or domain-based features. This partitioning can ensure that GPUs can be interworked with a desired compute unit and that more than one GPU, such as more than eight (8) GPUs can be associated with a particular compute unit. Moreover, dynamic GPU-compute unit relationships can be adjusted on-the-fly using partitioning across the PCIe fabric. Shared network resources can also be applied across compute units for graphics processing elements. For example, when a first compute processor determines that the first compute processor does not physically manage the graphics unit associated with a received graphics operation, then the first compute processor transfers the graphics operation over the PCIe fabric to another compute processor of the cluster that does manage the graphics unit.

In further examples, memory mapped direct memory access (DMA) conduits can be formed between individual CPU/GPU pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs.

In storage operations, such as a write operation, data can be received over network interfaces 140 of a particular cluster by a particular processor of that cluster. Load balancing or other factors can allow any network interface of that cluster to receive storage operations for any of the processors of that cluster and for any of the storage units of that cluster. For example, the write operation can be a write operation received over a first network interface 140 of a first cluster from an end user employing an iSCSI protocol or NVMe protocol. A first processor of the cluster can receive the write operation and determine if the first processor manages the storage drive or drives associated with the write operation, and if the first processor does, then the first processor transfers the data for storage on the associated storage drives of a storage unit over the PCIe fabric. The individual PCIe switches 150 of the PCIe fabric can be configured to route PCIe traffic associated with the cluster among the various storage, processor, and network elements of the cluster, such as using domain-based routing or NT ports. If the first processor determines that the first processor does not physically manage the storage drive or drives associated with the write operation, then the first processor transfers the write operation to another processor of the cluster that does manage the storage drive or drives over the PCIe fabric. Data striping can be employed by any processor to stripe data for a particular write transaction over any number of storage drives or storage units, such as over one or more of the storage units of the cluster.

In this example, PCIe fabric 151 associated with platform 100 has 64-bit address spaces, which allows an addressable space of $2^{64}$ bytes, leading to at least 16 exbibytes of byte-addressable memory. The 64-bit PCIe address space can shared by all compute units or segregated among various compute units forming clusters for appropriate memory mapping to resource units. The individual PCIe switches 150 of the PCIe fabric can be configured to segregate and route PCIe traffic associated with particular clusters among the various storage, compute, graphics processing, and network elements of the cluster. This segregation and routing can be establishing using domain-based routing or NT ports to establish cross-point connections among the various PCIe switches of the PCIe fabric. Redundancy and failover pathways can also be established so that traffic of the cluster can still be routed among the elements of the cluster when one or more of the PCIe switches fails or becomes unresponsive. In some examples, a mesh configuration is formed by the PCIe switches of the PCIe fabric to ensure redundant routing of PCIe traffic.

Management processor 110 controls the operations of PCIe switches 150 and PCIe fabric 151 over one or more interfaces, which can include inter-integrated circuit (I2C) interfaces that communicatively couple each PCIe switch of the PCIe fabric. Management processor 110 can establish NT-based or domain-based segregation among a PCIe address space using PCIe switches 150. Each PCIe switch can be configured to segregate portions of the PCIe address space to establish cluster-specific partitioning. Various configuration settings of each PCIe switch can be altered by management processor 110 to establish the domains and cluster segregation. In some examples, management processor 110 can include a PCIe interface and communicate/configure the PCIe switches over the PCIe interface or sideband interfaces transported within the PCIe protocol signaling.

Management operating system (OS) 111 is executed by management processor 110 and provides for management of resources of platform 100. The management includes creation, alteration, and monitoring of one or more clusters comprising one or more compute units. Management OS 111 provides for the functionality and operations described herein for management processor 110.

Management processor 110 also includes user interface 112, which can present graphical user interface (GUI) 170 to one or more users. User interface 112 and GUI 170 can be employed by end users or administrators to establish clusters, assign assets (compute units/machines) to each cluster. In FIG. 1, GUI 170 allows end users to create and administer clusters as well as assign one or more machine/compute units to the clusters. GUI 170 provides telemetry information for the operation of system 100 to end users, such as in one or more status interfaces or status views. The state of various components or elements of system 100 can be monitored through GUI 170, such as processor/CPU state, network state, storage unit state, PCIe element state, among others. Example GUI layouts are shown in FIGS. 11-14. User interface 112 can provide other user interfaces than GUI 170, such as command line interfaces, application programming interfaces (APIs), or other interfaces. In some examples, GUI 170 is provided over a websockets-based interface.

More than one more than one management processor can be included in a system, such as when each management processor can manage resources for a predetermined number of clusters or compute units. User commands, such as those received over a GUI, can be received into any of the management processors of a system and forwarded by the receiving management processor to the handling management processor. Each management processor can have a unique or pre-assigned identifier which can aid in delivery of user commands to the proper management processor. Additionally, management processors can communicate with each other, such as using a mailbox process or other data exchange technique. This communication can occur over dedicated sideband interfaces, such as I2C interfaces, or can occur over PCIe, Ethernet, or InfiniBand interfaces that couple each management processor.

Management OS 111 also includes emulated network interface 113. Emulated network interface 113 comprises a transport mechanism for transporting network traffic over one or more PCIe interfaces. Emulated network interface 113 can emulate a network device, such as an Ethernet or InfiniBand device, to management processor 110 so that management processor 110 can interact/interface with any of processing modules 120 over a PCIe interface as if the processor was communicating over a network interface. Emulated network interface 113 can comprise a kernel-level element or module which allows management OS 111 to interface using Ethernet or InfiniBand-style commands and drivers. Emulated network interface 113 allows applications or OS-level processes to communicate with the emulated network device without having associated latency and processing overhead associated with a network stack. Emulated network interface 113 comprises a software component, such as a driver, module, kernel-level module, or other software component that appears as a network device to the application-level and system-level software executed by the processor device.

In the examples herein, network interface 113 advantageously does not require network stack processing to transfer communications. Instead, emulated network interface 113 transfers communications as associated traffic over a PCIe interface or PCIe fabric to another emulated network device. Emulated network interface 113 does not employ network stack processing yet still appears as network device to the operating system of an associated processor, so that user software or operating system elements of the associated processor can interact with network interface 113 and communicate over a PCIe fabric using existing network-facing communication methods, such as Ethernet or InfiniBand communications.

Emulated network interface 113 translates PCIe traffic into network device traffic and vice versa. Processing communications transferred to the network device over a network stack is omitted, where the network stack would typically be employed for the type of network device/interface presented. For example, the network device might be presented as an Ethernet or InfiniBand device to the operating system or applications. Communications received from the operating system or applications are to be transferred by the network device to one or more destinations. However, emulated network interface 113 does not include a network stack to process the communications down from an application layer down to a link layer. Instead, emulated network interface 113 extracts the payload data and destination from the communications received from the operating system or applications and translates the payload data and destination into PCIe traffic, such as by encapsulating the payload data into PCIe frames using addressing associated with the destination.

Management driver 141 is included on each processing module 120. Management driver 141 can include emulated network interfaces, such as discussed for emulated network interface 113. Additionally, management driver 141 monitors operation of the associated processing module 120 and software executed by a CPU of processing module 120 and provides telemetry for this operation to management processor 110. Thus, any user provided software can be executed by CPUs of processing modules 120, such as user-provided operating systems (Windows, Linux, MacOS, Android, iOS, etc. . . . ) or user application software and drivers. Management driver 141 provides functionality to allow each processing module 120 to participate in the associated compute unit and/or cluster, as well as provide telemetry data to an associated management processor. Each processing module 120 can also communicate with each other over an emulated network device that transports the network traffic over the PCIe fabric. Driver 141 also provides an API for user software and operating systems to interact with driver 141 as well as exchange control/telemetry signaling with management processor 110.

Figure 2:
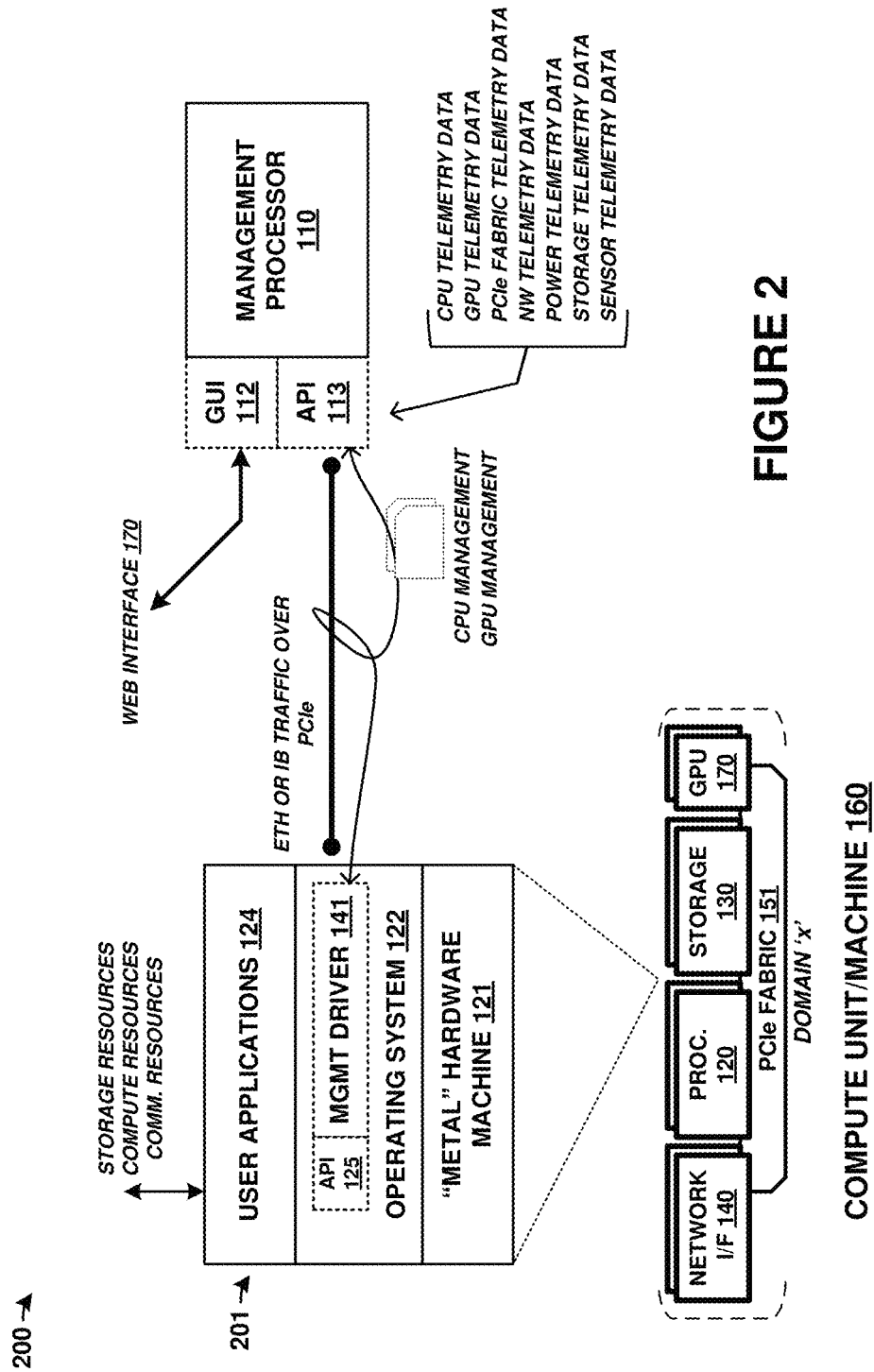
FIG. 2 is a diagram illustrating management of a computing platform in an implementation.

FIG. 2 is a system diagram that includes further details on elements from FIG. 1. System 200 includes a detailed view of an implementation of processing module 120 as well as management processor 110.

In FIG. 2, processing module 120 can be an exemplary processor in any compute unit or machine of a cluster. Detailed view 201 shows several layers of processing module 120. A first layer 121 is the hardware layer or "metal" machine infrastructure of processor processing module 120. A second layer 122 provides the OS as well as management driver 141 and API 125. Finally, a third layer 124 provides user-level applications. View 201 shows that user applications can access storage, processing (CPU or GPU), and communication resources of the cluster, such as when the user application comprises a clustered storage system or a clustered processing system.

As discussed above, driver 141 provides an emulated network device for communicating over a PCIe fabric with management processor 110 (or other processor elements). This is shown in FIG. 2 as Ethernet or InfiniBand traffic transported over PCIe. However, a network stack is not employed in driver 141 to transport the traffic over PCIe. Instead, driver 141 appears as a network device to an operating system or kernel to each processing module 120. User-level services/applications/software can interact with the emulated network device without modifications from a normal or physical network device. However, the traffic associated with the emulated network device is transported over a PCIe link or PCIe fabric, as shown. API 113 can provide a standardized interface for the management traffic, such as for control instructions, control responses, telemetry data, status information, or other data.

Figure 3:
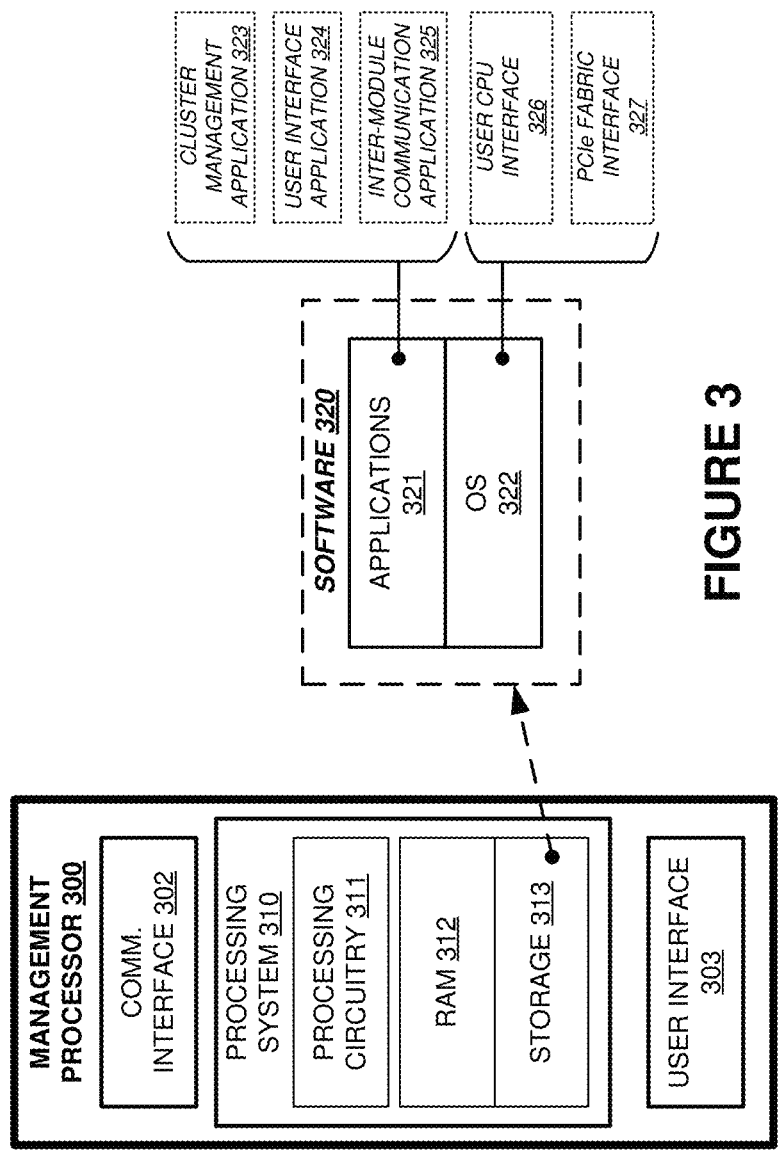
FIG. 3 is s block diagram illustrating a management processor in an implementation.

FIG. 3 is s block diagram illustrating management processor 300. Management processor 300 illustrates an example of any of the management processors discussed herein, such as processor 110 of FIG. 1. Management processor 300 includes communication interface 302, user interface 303, and processing system 310. Processing system 310 includes processing circuitry 311, random access memory (RAM) 312, and storage 313, although further elements can be included.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Communication interface 302 includes one or more communication and network interfaces for communicating over communication links, networks, such as packet networks, the Internet, and the like. The communication interfaces can include PCIe interfaces, Ethernet interfaces, InfiniBand interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet, InfiniBand, or Internet protocol (IP) links. Communication interface 302 can include network interfaces configured to communicate using one or more network addresses, which can be associated with different network links. Examples of communication interface 302 include network interface card equipment, transceivers, modems, and other communication circuitry.

User interface 303 may include a touchscreen, keyboard, mouse, voice input device, audio input device, or other touch input device for receiving input from a user. Output devices such as a display, speakers, web interfaces, terminal interfaces, and other types of output devices may also be included in user interface 303. User interface 303 can provide output and receive input over a network interface, such as communication interface 302. In network examples, user interface 303 might packetize display or graphics data for remote display by a display system or computing system coupled over one or more network interfaces. Physical or logical elements of user interface 303 can provide alerts or visual outputs to users or other operators. User interface 303 may also include associated user interface software executable by processing system 310 in support of the various user input and output devices discussed above. Separately or in conjunction with each other and other hardware and software elements, the user interface software and user interface devices may support a graphical user interface, a natural user interface, or any other type of user interface.

RAM 312 and storage 313 together can comprise a non-transitory data storage system, although variations are possible. RAM 312 and storage 313 can each comprise any storage media readable by processing circuitry 311 and capable of storing software. RAM 312 can include volatile and nonvolatile, removable and non-removable media implemented in any method or technology for storage of information, such as computer readable instructions, data structures, program modules, or other data. Storage 313 can include non-volatile storage media, such as solid state storage media, flash memory, phase change memory, or magnetic memory, including combinations thereof. RAM 312 and storage 313 can each be implemented as a single storage device but can also be implemented across multiple storage devices or sub-systems. RAM 312 and storage 313 can each comprise additional elements, such as controllers, capable of communicating with processing circuitry 311.

Software stored on or in RAM 312 or storage 313 can comprise computer program instructions, firmware, or some other form of machine-readable processing instructions having processes that when executed a processing system direct processor 300 to operate as described herein. For example, software 320 can drive processor 300 to receive user commands to establish clusters comprising compute blocks among a plurality of physical computing components that include processing modules, storage modules, and network modules. Software 320 can drive processor 300 to receive and monitor telemetry data, statistical information, operational data, and other data to provide telemetry to users and alter operation of clusters according to the telemetry data or other data. Software 320 can drive processor 300 to manage cluster and compute/graphics unit resources, establish domain partitioning or NT partitioning among PCIe fabric elements, and interface with individual PCIe switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 320 illustrates a detailed view of an example configuration of RAM 312. It should be understood that different configurations are possible. System software 320 includes applications 321 and operating system (OS) 322. Software applications 323-326 each comprise executable instructions which can be executed by processor 300 for operating a cluster controller or other circuitry according to the operations discussed herein.

Specifically, cluster management application 323 establishes and maintains clusters and compute units among various hardware elements of a computing platform, such as seen in FIG. 1. User interface application 324 provides one or more graphical or other user interfaces for end users to administer associated clusters and compute units and monitor operations of the clusters and compute units. Inter-module communication application 325 provides communication among other processor 300 elements, such as over I2C, Ethernet, InfiniBand, emulated network devices, or PCIe interfaces. User CPU interface 327 provides communication, APIs, and emulated network devices for communicating with processors of compute units, and specialized driver elements thereof. PCIe fabric interface 328 establishes various logical partitioning or domains among PCIe switch elements, controls operation of PCIe switch elements, and receives telemetry from PCIe switch elements.

Software 320 can reside in RAM 312 during execution and operation of processor 300, and can reside in storage system 313 during a powered-off state, among other locations and states. Software 320 can be loaded into RAM 312 during a startup or boot procedure as described for computer operating systems and applications. Software 320 can receive user input through user interface 303. This user input can include user commands, as well as other input, including combinations thereof.

Storage system 313 can comprise flash memory such as NAND flash or NOR flash memory, phase change memory, magnetic memory, among other solid state storage technologies. As shown in FIG. 3, storage system 313 includes software 320. As described above, software 320 can be in a non-volatile storage space for applications and OS during a powered-down state of processor 300, among other operating software.

Processor 300 is generally intended to represent a computing system with which at least software 320 is deployed and executed in order to render or otherwise implement the operations described herein. However, processor 300 can also represent any computing system on which at least software 320 can be staged and from where software 320 can be distributed, transported, downloaded, or otherwise provided to yet another computing system for deployment and execution, or yet additional distribution.

Figure 4:
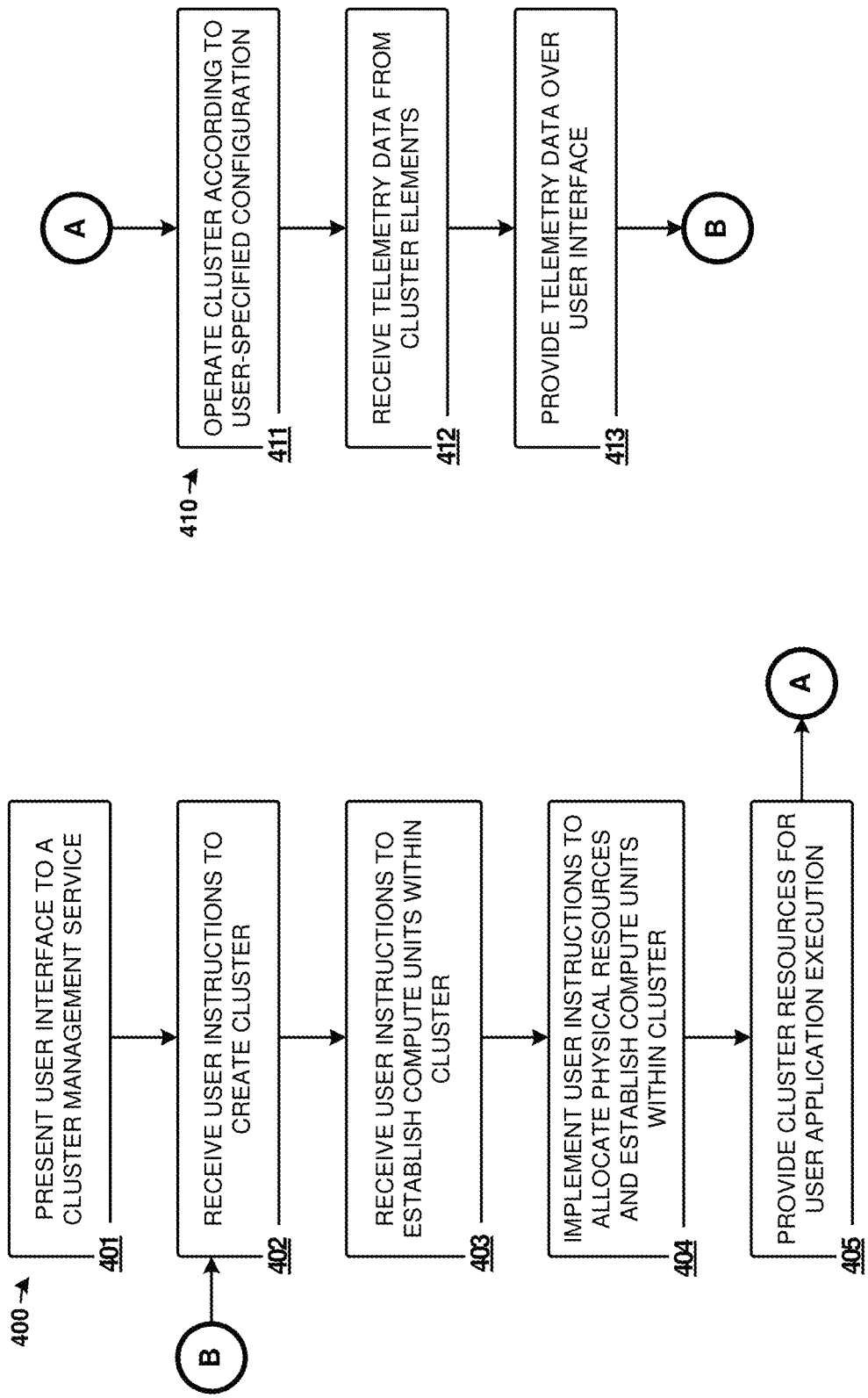
FIG. 4 illustrates flow diagrams of operating a computing platform in an implementation.

FIG. 4 includes flow diagrams that illustrate operational examples for any of the systems discussed herein, such as for platform 100 of FIG. 1, system 200 of FIG. 2, or processor 300 of FIG. 3. In FIG. 4, operations will be discussed in context of elements of FIGS. 1 and 2, although the operations can also apply to those in FIG. 3.

Management processor 110 presents (401) a user interface to a cluster management service. This user interface can comprise GUI 170 or other user interfaces. The user interface allows users to create clusters (402) and assign resources thereto. The clusters can be represented graphically according to what resources have been assigned, and can have associated names or identifiers specified by the users, or predetermined by the system. The user can then establish compute blocks (403) and assign these compute blocks to clusters. The compute blocks can have resource elements/units such as processing elements, graphics processing elements, storage elements, and network interface elements, among other elements.

Once the user specifies these various clusters and compute blocks within the clusters, then management processor 110 can implement (404) the instructions. The implementation can include allocating resources to particular clusters and compute units within allocation tables or data structures maintained by processor 110. The implementation can also include configuring PCIe switch elements of a PCIe fabric to logically partition the resources into a routing domain for the PCIe fabric. The implementation can also include initializing processors, storage drives, GPUs, memory devices, and network elements to bring these elements into an operational state and associated these elements with a particular cluster or compute unit. Moreover, the initialization can include deploying user software to processors, configuring network interfaces with associated addresses and network parameters, and establishing partitions or logical units (LUNs) among the various storage elements. Once these resources have been assigned to the cluster/compute unit and initialized, then they can be made available to users for executing user operating systems, user applications, and for user storage processes, among other user purposes.

FIG. 4 further illustrates continued operation, such as for a user to monitor or modify operation of an existing cluster or compute units. An iterative process can occur where a user can monitor and modify elements and these elements can be re-assigned, aggregated into the cluster, or disaggregated from the cluster.

In operation 411, the cluster is operated according to user specified configurations, such as those discussed in FIG. 4. The operations can include executing user operating systems, user applications, user storage processes, graphics operations, among other user operations. During operation, telemetry is received (412) by processor 110 from the various cluster elements, such as PCIe switch elements, processing elements, storage elements, network interface elements, and other elements, including user software executed by the computing elements. The telemetry data can be provided (413) over the user interface to the users, stored in one or more data structures, and used to prompt further user instructions (operation 402) or to modify operation of the cluster.

The systems and operations discussed herein provide for dynamic assignment of computing resources, graphics processing resources, network resources, or storage resources to a computing cluster. The computing units are disaggregated from any particular cluster or computing unit until allocated by users of the system. Management processors can control the operations of the cluster and provide user interfaces to the cluster management service provided by software executed by the management processors. A cluster includes at least one "machine" or computing unit, while a computing unit include at least a processor element. Computing units can also include network interface elements, graphics processing elements, and storage elements, but these elements are not required for a computing unit.

Processing resources and other elements (graphics processing, network, storage) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources can have unique identifiers assigned thereto for use in identification by the management processor and for identification on the PCIe fabric. User supplied software such as operating systems and applications can be deployed to processing resources as-needed when the processing resources are initialized after adding into a compute unit, and the user supplied software can be removed from a processing resource when that resource is removed from a compute unit. The user software can be deployed from a storage system that the management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, iSCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources, such as GPUs, can be shared among more than one compute unit of a cluster using NT partitioning or domain-based partitioning over the PCIe fabric and PCIe switches.

Figure 5:
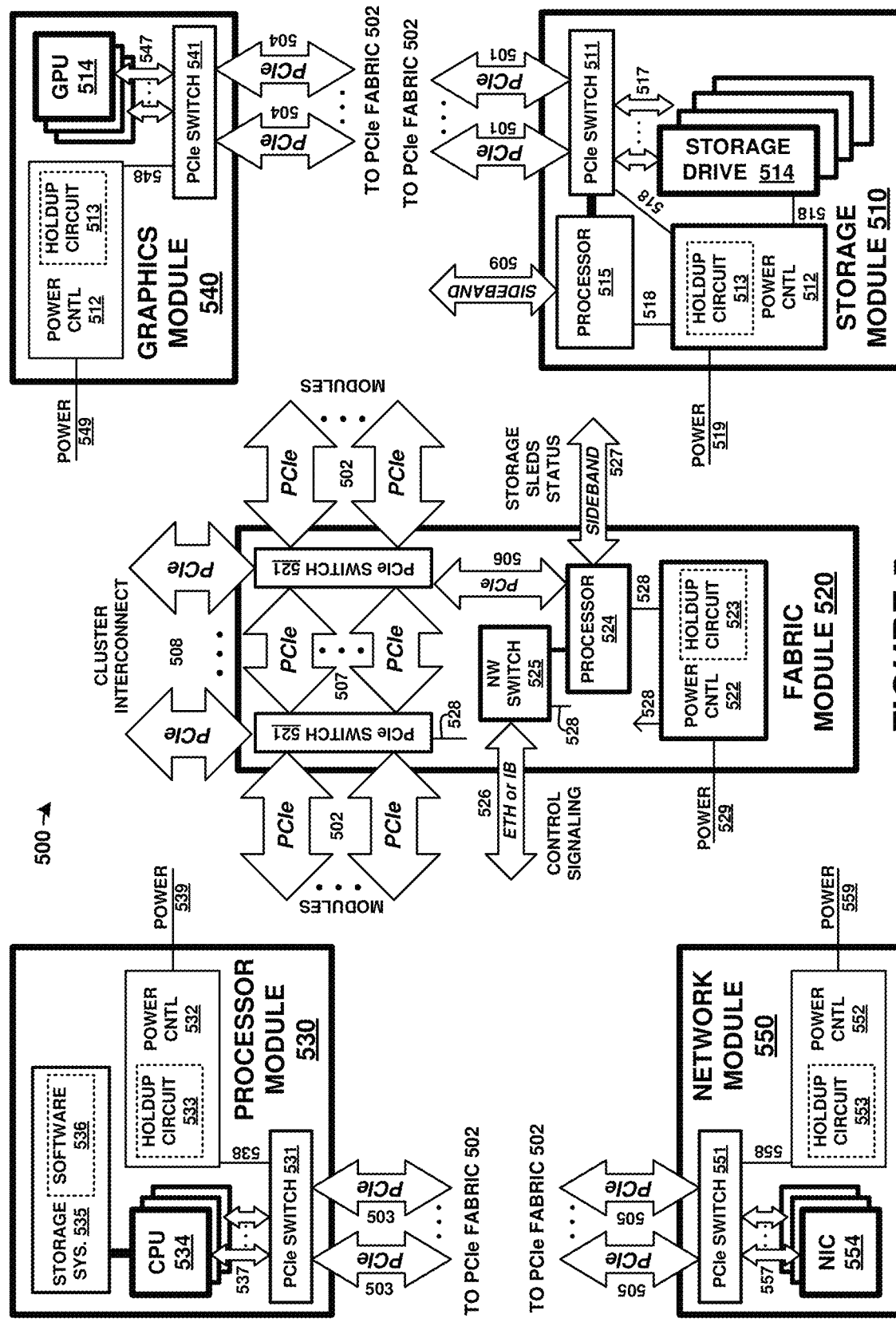
FIG. 5 is a diagram illustrating components of a computing platform in an implementation.

FIG. 5 is a block diagram illustrating resource elements of computing platform 500, such as computing platform 110. The resource elements are coupled over a PCIe fabric provided by fabric module 520. PCIe fabric links 501-507 each provide PCIe links internal to an enclosure comprising computing platform 500. Cluster PCIe fabric links 508 comprise external PCIe links for interconnecting individual enclosures comprising a cluster.

Multiple instances of resource units 510, 530, 540, and 550 are typically provided, and can be logically coupled over the PCIe fabric established by fabric module 520. More than one fabric module 520 might be included to achieve the PCIe fabric, depending in part on the number of resource units 510, 530, 540, and 550.

The modules of FIG. 5 each include one or more PCIe switches (511, 521, 531, 541, 551), one or more power control modules (512, 522, 532, 542, 552) with associated holdup circuits (513, 523, 533, 543, 553), power links (518, 528, 538, 548, 558), and internal PCIe links (517, 527, 537, 547, 557). It should be understood that variations are possible, and one or more of the components of each module might be omitted.

Fabric module 520 provides at least a portion of a Peripheral Component Interconnect Express (PCIe) fabric comprising PCIe links 501-508. PCIe links 508 provide external interconnect for devices of a computing/storage cluster, such as to interconnect various computing/storage rackmount modules. PCIe links 501-507 provide internal PCIe communication links and to interlink the one or more PCIe switches 521. Fabric module 520 also provides one or more Ethernet or InfiniBand network links 526 via network switch 525. Various sideband or auxiliary links 527 can be employed as well in fabric module 520, such as System Management Bus (SMBus) links, Joint Test Action Group (JTAG) links, Inter-Integrated Circuit (I2C) links, Serial Peripheral Interfaces (SPI), controller area network (CAN) interfaces, universal asynchronous receiver/transmitter (UART) interfaces, universal serial bus (USB) interfaces, or any other communication interfaces. Further communication links can be included that are not shown in FIG. 5 for clarity.

Each of links 501-508 can comprise various widths or lanes of PCIe signaling. PCIe can support multiple bus widths, such as x1, x4, x8, x16, and x32, with each multiple of bus width comprising an additional "lane" for data transfer. PCIe also supports transfer of sideband signaling, such as SMBus and JTAG, as well as associated clocks, power, and bootstrapping, among other signaling. For example, each of links 501-508 can comprise PCIe links with four lanes "x4" PCIe links, PCIe links with eight lanes "x8" PCIe links, or PCIe links with 16 lanes "x16" PCIe links, among other lane widths.

Power control modules (512, 522, 532, 542, 552) can be included in each module. Power control modules receive source input power over associated input power links (519, 529, 539, 549, 559) and converts/conditions the input power for use by the elements of the associated module. Power control modules distribute power to each element of the associated module over associated power links. Power control modules include circuitry to selectively and individually provide power to any of the elements of the associated module. Power control modules can receive control instructions from an optional control processor over an associated PCIe link or sideband link (not shown in FIG. 5 for clarity). In some examples, operations of power control modules are provided by processing elements discussed for control processor 524. Power control modules can include various power supply electronics, such as power regulators, step up converters, step down converters, buck-boost converters, power factor correction circuits, among other power electronics. Various magnetic, solid state, and other electronic components are typically sized according to the maximum power draw for a particular application, and these components are affixed to an associated circuit board.

Holdup circuits (513, 523, 533, 543, 553) include energy storage devices for storing power received over power links for use during power interruption events, such as loss of input power. Holdup circuits can include capacitance storage devices, such as an array of capacitors, among other energy storage devices. Excess or remaining holdup power can be held for future use, bled off into dummy loads, or redistributed to other devices over PCIe power links or other power links.

Each PCIe switch (511, 521, 531, 541, 551) comprises one or more PCIe crosspoint switches, which logically interconnect various ones of the associated PCIe links based at least on the traffic carried by associated PCIe links. Each PCIe switch establishes switched connections between any PCIe interfaces handled by each PCIe switch. In some examples, ones of the PCIe switches comprise a PLX Technology PEX8796 24-port, 96 lane PCIe switch chip, or a PLX Technology PEX8725 10-port, 24 lane PCIe switch chip. In some examples, redundancy is established via one or more PCIe switches, such as having primary and secondary/backup ones among the PCIe switches. Failover from primary PCIe switches to secondary/backup PCIe switches can be handled by at least control processor 524. In some examples, primary and secondary functionality can be provided in different PCIe switches using redundant PCIe links to the different PCIe switches. In other examples, primary and secondary functionality can be provided in the same PCIe switch using redundant links to the same PCIe switch.

PCIe switches 521 each include cluster interconnect interfaces 508 which are employed to interconnect further modules of storage systems in further enclosures. Cluster interconnect provides PCIe interconnect between external systems, such as other storage systems, over associated external connectors and external cabling. These connections can be PCIe links provided by any of the included PCIe switches, among other PCIe switches not shown, for interconnecting other modules of storage systems via PCIe links. The PCIe links used for cluster interconnect can terminate at external connectors, such as mini-Serial Attached SCSI (SAS) connectors or Quad Small Form Factor Pluggable (QS1-1-P) or QSFP/QSFP+ jacks, which are employed to carry PCIe signaling over associated cabling, such as mini-SAS or QSFFP cabling. In further examples, MiniSAS HD cables are employed that drive 12 Gb/s versus 6 Gb/s of standard SAS cables. 12 Gb/s can support at least PCIe Generation 3.

PCIe links 501-508 can also carry NVMe (NVM Express) traffic issued by a host processor or host system. NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Each resource unit of FIG. 5 also includes associated resource elements. Storage modules 510 include one or more storage drives 514. Processor modules 530 include one or more central processing units (CPUs) 534, storage systems 535, and software 536. Graphics modules 540 include one or more graphics processing units (GPUs) 544. Network modules 550 include one or more network interface cards (NICs) 554. It should be understood that other elements can be included in each resource unit, including memory devices, auxiliary processing devices, support circuitry, circuit boards, connectors, module enclosures/chassis, and other elements.

Figure 6:
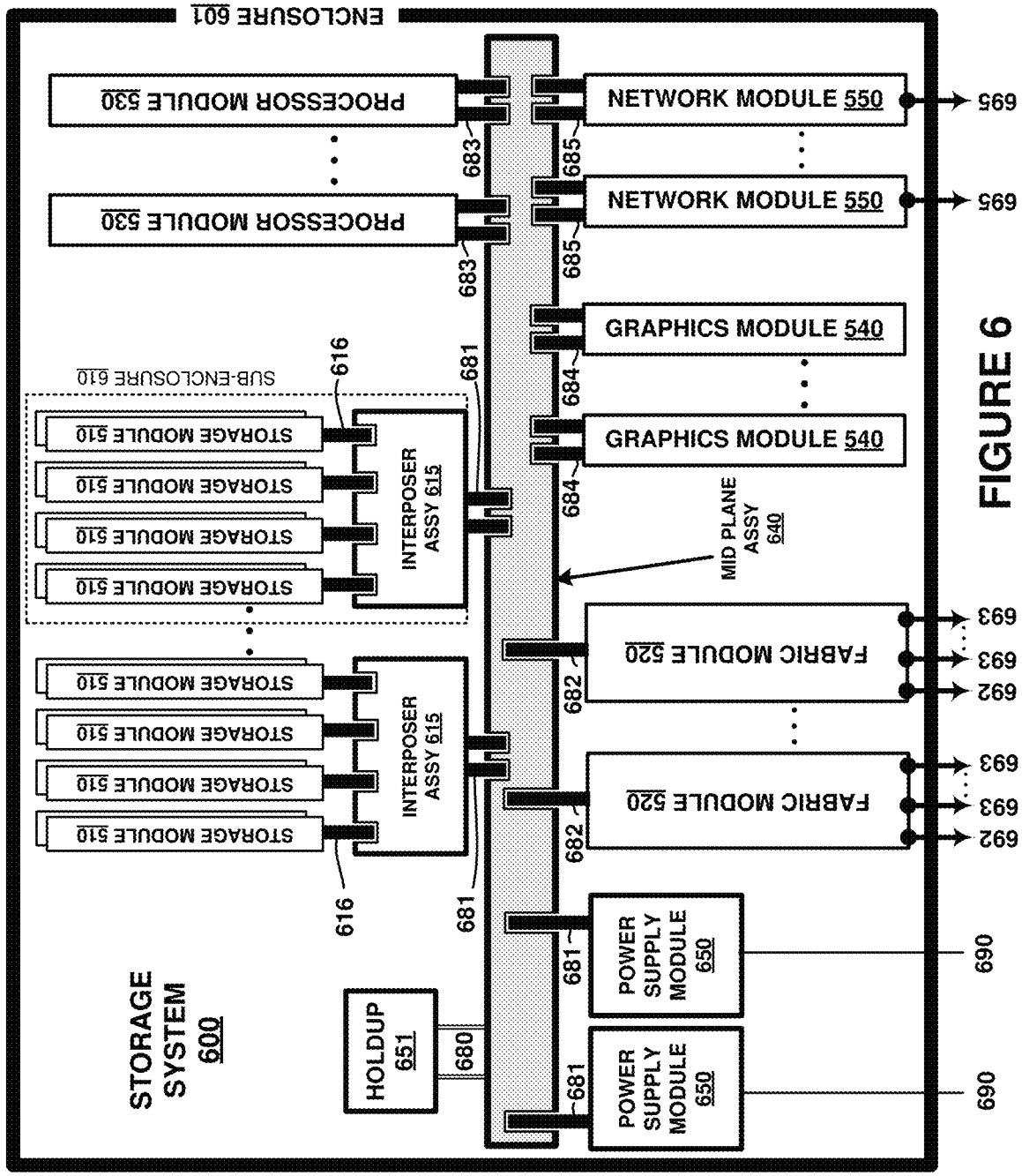
FIG. 6 is a diagram illustrating components of a computing platform in an implementation.

FIG. 6 is a block diagram illustrating storage system 600. FIG. 6 is a block diagram illustrating the various modules of the previous figures as related to a midplane. The elements of FIG. 6 are shown as physically mated to a midplane assembly. Midplane assembly 640 includes circuit board elements and a plurality of physical connectors for mating with any associated interposer assemblies 615, storage sub-enclosures 610, fabric modules 520, processor modules 530, graphics modules 540, network modules 550, or power supply modules 650. Midplane 640 comprises one or more printed circuit boards, connectors, physical support members, chassis elements, structural elements, and associated links as metallic traces or optical links for interconnecting the various elements of FIG. 6. Midplane 640 can function as a backplane, but instead of having sleds or modules mate on only one side as in single-ended backplane examples, midplane 640 has sleds or modules that mate on at least two sides, namely a front and rear. Elements of FIG. 6 can correspond to similar elements of the Figures herein, such as computing platform 100, although variations are possible.

FIG. 6 shows many elements included in a 1U enclosure 601. The enclosure can instead be of any multiple of a standardized computer rack height, such as 1U, 2U, 3U, 4U, 5U, 6U, 7U, and the like, and can include associated chassis, physical supports, cooling systems, mounting features, cases, and other enclosure elements. Typically, each sled or module will fit into associated slot or groove features included in a chassis portion of enclosure 601 to slide into a predetermined slot and guide a connector or connectors associated with each sled to mate with an associated connector or connectors on midplane 640. System 600 enables hot-swapping of any of the modules or sleds and can include other features such as power lights, activity indicators, external administration interfaces, and the like.

Storage sleds 510 each have an associated connector 616 which mates into a mating connector of an associated interposer assembly 615. Each interposer assembly 615 has associated connectors 681 which mate with one or more connectors on midplane 640. In this example, up to eight storage sleds 510 can be inserted into a single interposer assembly 615 which subsequently mates to a plurality of connectors on midplane 640. These connectors can be a common or shared style/type which is used by processor modules 530 and connector 683. Additionally, each collection of storage sleds 510 and interposer assembly 615 can be included in a sub-assembly or sub-enclosure 610 which is insertable into midplane 640 in a modular fashion. Processor modules 530 each have an associated connector 683, which can be a similar type of connector as interposer assembly 615. In some examples, such as in the examples above, processor modules 530 each plug into more than one mating connector on midplane 640.

Fabric modules 520 couple to midplane 640 via connector 682 and provide cluster-wide access to the storage and processing components of system 600 over cluster interconnect links 693. Fabric modules 520 provide control plane access between controller modules of other 1U systems over control plane links 692. In operation, fabric modules 520 each are communicatively coupled over a PCIe mesh via link 682 and midplane 640 with processor modules 530, graphics modules 540, and storage modules 510, such as pictured in FIG. 6.

Graphics modules 540 comprises one or more graphics processing units (GPUs) along with any associated support circuitry, memory elements, and general processing elements. Graphics modules 540 couple to midplane 640 via connector 684.

Network modules 550 comprise one or more network interface card (NIC) elements, which can further include transceivers, transformers, isolation circuitry, buffers, and the like. Network modules 550 might comprise Gigabit Ethernet or InfiniBand interface circuitry that can carry associated Ethernet or InfiniBand traffic, along with any associated Internet protocol (IP) and transmission control protocol (TCP) traffic, among other network communication formats and protocols. Network modules 550 couple to midplane 640 via connector 685.

Cluster interconnect links 693 can comprise PCIe links or other links and connectors. The PCIe links used for external interconnect can terminate at external connectors, such as mini-SAS or mini-SAS HD jacks or connectors which are employed to carry PCIe signaling over mini-SAS cabling. In further examples, mini-SAS HD cables are employed that drive 12 Gb/s versus 6 Gb/s of standard SAS cables. 12 Gb/s can support PCIe Gen 3. Quad (4-channel) Small Form-factor Pluggable (QSFP or QSFP+) connectors or jacks can be employed as well for carrying PCIe signaling.

Control plane links 692 can comprise Ethernet or Infini-Band links for carrying control plane communications. Associated Ethernet jacks can support 10 Gigabit Ethernet (10 GbE), among other throughputs. Associated InfiniBand jacks can support corresponding InfiniBand throughputs. Further external interfaces can include PCIe connections, FiberChannel connections, administrative console connections, sideband interfaces such as USB, RS-232, video interfaces such as video graphics array (VGA), high-density media interface (HDMI), digital video interface (DVI), among others, such as keyboard/mouse connections.

External links 695 can comprise network links which can comprise Ethernet, TCP/IP, InfiniBand, iSCSI, or other external interfaces. External links 695 can comprise links for communicating with external systems, such as host systems, management systems, end user devices, Internet systems, packet networks, servers, or other computing systems, including other enclosures similar to system 600. External links 695 can comprise Quad Small Form Factor Pluggable (QSFFP) or Quad (4-channel) Small Form-factor Pluggable (QSFP or QSFP+) jacks carrying at least 40 GbE signaling.

In some examples, system 600 includes case or enclosure elements, chassis, and midplane assemblies that can accommodate a flexible configuration and arrangement of sleds and associated circuit cards. Although FIG. 6 illustrates storage sleds mating and controller modules on a first side of midplane assembly 640 and various modules mating on a second side of midplane assembly 640, it should be understood that other configurations are possible.

System 600 can include a chassis to accommodate an assortment of configurations, either in front-loaded or rear-loaded configurations. These configurations can include storage modules that contain multiple SSDs each; modules containing HHHL cards (half-height half-length PCIe cards) or FHHL cards (full-height half-length PCIe cards), that can comprise graphics cards or graphics processing units (GPUs), PCIe storage cards, PCIe network adaptors, or host bus adaptors; modules with PCIe cards (full-height full-length PCIe cards) that comprise controller modules, which can comprise nVIDIA® Tesla, nVIDIA® Jetson, or Intel® Phi processor cards; modules containing 2.5-inch PCIe SSDs; cross-connect modules; interposer modules; and control elements, among other modules and configurations.

Additionally, power and associated power control signaling for the various sleds of system 600 is provided by one or more power supply modules 650 over associated links 681, which can comprise one or more links of different voltage levels, such as +12 VDC or +5 VDC, among others. Although power supply modules 650 are shown as included in system 600 in FIG. 6, it should be understood that power supply modules 650 can instead be included in separate enclosures, such as separate 1U enclosures. Each power supply node 650 also includes power link 690 for receiving power from power sources, such as AC or DC input power.

Additionally, power holdup circuitry can be included in holdup modules 651 which can deliver holdup power over links 680 responsive to power loss in link 690 or from a failure of power supply modules 650. Power holdup circuitry can also be included on each sled or module. This power holdup circuitry can be used to provide interim power to the associated sled or module during power interruptions, such as when main input or system power is lost from a power source. Additionally, during use of holdup power, processing portions of each sled or module can be employed to selectively power down portions of each sled according to usage statistics, among other considerations. This holdup circuitry can provide enough power to commit in-flight write data during power interruptions or power loss events. These power interruption and power loss events can include loss of power from a power source, or can include removal of a sled or module from an associated socket or connector on midplane 640. The holdup circuitry can include capacitor arrays, super-capacitors, ultra-capacitors, batteries, fuel cells, flywheels, or other energy storage components, along with any associated power control, conversion, regulation, and monitoring circuitry.

FIGS. 7-10 include further detail on a disaggregated computing architecture, such as discussed herein in FIG. 1 for computing platform 100. FIGS. 7-10 detail example configurations and methods of operating a disaggregated computing architecture. These examples include operating compute units in a clustered environment. The clusters can be formed using one or more compute units that each include a plurality of physical computing components communicatively coupled over a Peripheral Component Interconnect Express (PCIe) fabric.

The physical computing components include at least central processing units (CPUs), storage modules, graphics processing modules (GPUs), and network interface modules. These physical computing components are all communicatively coupled over a PCIe fabric. The PCIe fabric can isolate the compute units from each other or within clusters in the clustered environment using logical partitioning within the PCIe fabric. Moreover, software components can be deployed by a management processor to at least an associated CPU within each of the compute units responsive to formation of the compute units. Various monitoring functions can be included in the deployed software components, and telemetry can be reported to the management processor related to operation of the compute units.

In some examples, a network driver function of the software component is included that emulates operation of a network interface, such as an Ethernet or InfiniBand interface, to an operating system of an associated CPU of a compute unit for transfer of communications comprising at least the telemetry to the management processor over the PCIe fabric. The network driver function can include functionality for transferring communications over the PCIe fabric for delivery to the management processor without processing the communications through a network stack.

Based at least on the logical partitioning of the PCIe fabric, the compute units have visibility over the PCIe fabric to only a subset of the plurality of physical computing components assigned to each of the compute units within the PCIe fabric. Each particular compute unit lacks visibility over the PCIe fabric to other physical computing components that are communicatively coupled over the PCIe fabric and not assigned to the particular compute unit. However, the logical partitioning can also be configured to form clusters of compute units, where the compute units of the cluster can have visibility to other compute units of the cluster over the PCIe fabric, but be partitioned from having visibility to compute units not of the cluster. Typically, a management processor is configured to instruct the PCIe fabric to establish the logical partitioning within the PCIe fabric by at least forming domain-based PCIe segregation among ports of PCIe switches that comprise the PCIe fabric. However, the management processor can be configured to instruct the PCIe fabric to establish the logical partitioning within the PCIe fabric by at least forming non-transparent (NT) port-based PCIe segregation among ports of PCIe switches that comprise the PCIe fabric.

Dynamic alterations to the composition of the compute units and compute clusters can also be achieved. These dynamic alterations can be responsive to user instructions, graphical user interface indications received from users, or by automated processes that detect performance of the compute units and compute clusters. For example, responsive to alteration of the logical partitioning by the management processor, the disaggregated platform changes a composition of the plurality of physical computing components within a compute unit. The composition of the plurality of physical computing components within a compute unit can be altered to include at least one more CPU, GPU, storage module, and network interface module. The composition of the plurality of physical computing components within a compute unit can be altered to reduce a quantity of a CPU, GPU, storage module, and network interface module included in the compute unit.

Moreover, clusters can be altered to increase or decrease the number of compute units included therein, such as to increase processing power of a cluster by adding more compute units on-the-fly. Thus, both compute units and clusters can be managed dynamically for enhanced responsiveness to workload, user requirements, scheduling, and other considerations. Since the physical computing components are all coupled via a flexible and configurable PCIe fabric, the physical computing components can be spun-up and spun-down as-needed and in response to various conditions and requirements. In a specific example, a compute unit might not initially be formed with a GPU, but later requirements or workload changes might warrant inclusion of a GPU or more than one GPU into the compute unit. The PCIe fabric partitioning can be altered on-the-fly to allow one or more GPUs to be associated with the CPU or CPUs of the particular compute unit.

Figure 7:
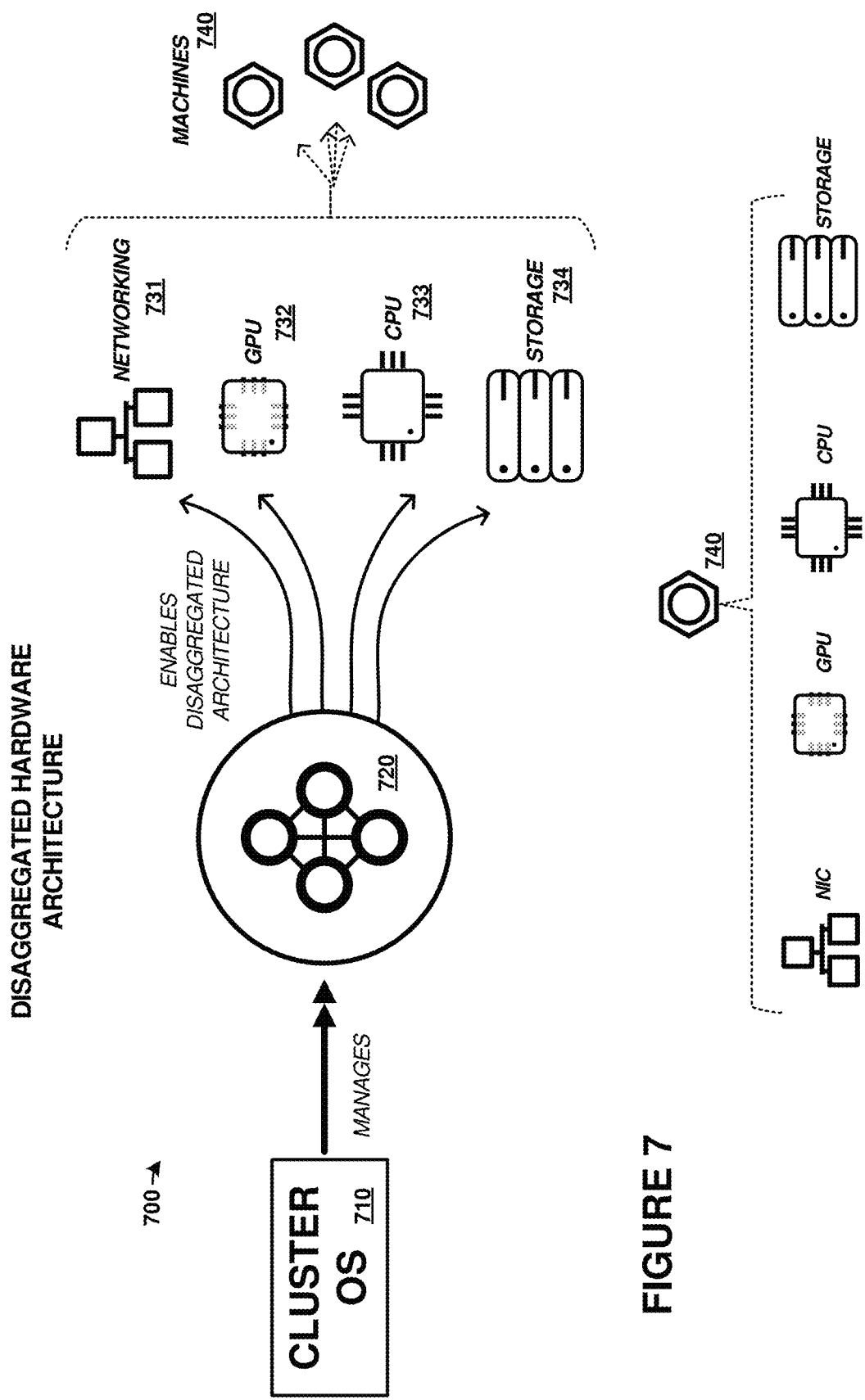
FIG. 7 illustrates example cluster management implementations.

FIG. 7 illustrates a disaggregated infrastructure 700 highlighting cluster management operating system (OS) 710 executed by a management processor and control of PCIe fabric 720. The management OS provides for the management, automation, and orchestration of storage, compute, GPU, and network elements on PCIe-based fabrics. For example, storage elements 734, central processing elements (CPU) 733, graphics processing elements (GPU) 732, and network interface card (NIC) elements 731 are all able to be communicatively coupled over PCIe fabric 720. The PCIe fabric enables the disaggregated architecture by providing a partition-able communication medium for coupling the various elements into compute units and grouping the compute units into clusters.

To provide the disaggregated architecture, FIG. 7 illustrates a pool of free elements (731-734) that have not yet been assigned to a particular "machine" 740 or compute unit. The free elements are physically present in the associated system but remain idle or unassigned to a particular cluster/machine/compute unit. The management OS can select among the free elements and assign selected ones of the free elements to a machine. Requirements for the machine, such as what tasks the machine is being employed for, can be processed by the management OS to aid in selection of proper elements among the free compute, GPU, network, and storage elements. Users can interface with graphical or command-line interfaces that allow definition or indication of the requirements or other user targets.

The management OS can learn to recognize various requests for elements and select suitable elements from the free pool. For example, the management OS can recognize particular user-provided operating systems or user-provided applications that run on a cluster, and select certain free elements to include in one or more machines based on that recognition. In one example, the operating system to be executed by a particular machine might be specified by a user to be a Linux operating system. Particular elements can be selected from the free pool to enable the machine to run the Linux operating system. User applications, operating systems, storage requirements, interface or traffic requirements, or other considerations can be used to select elements to include in each machine.

Figure 8:
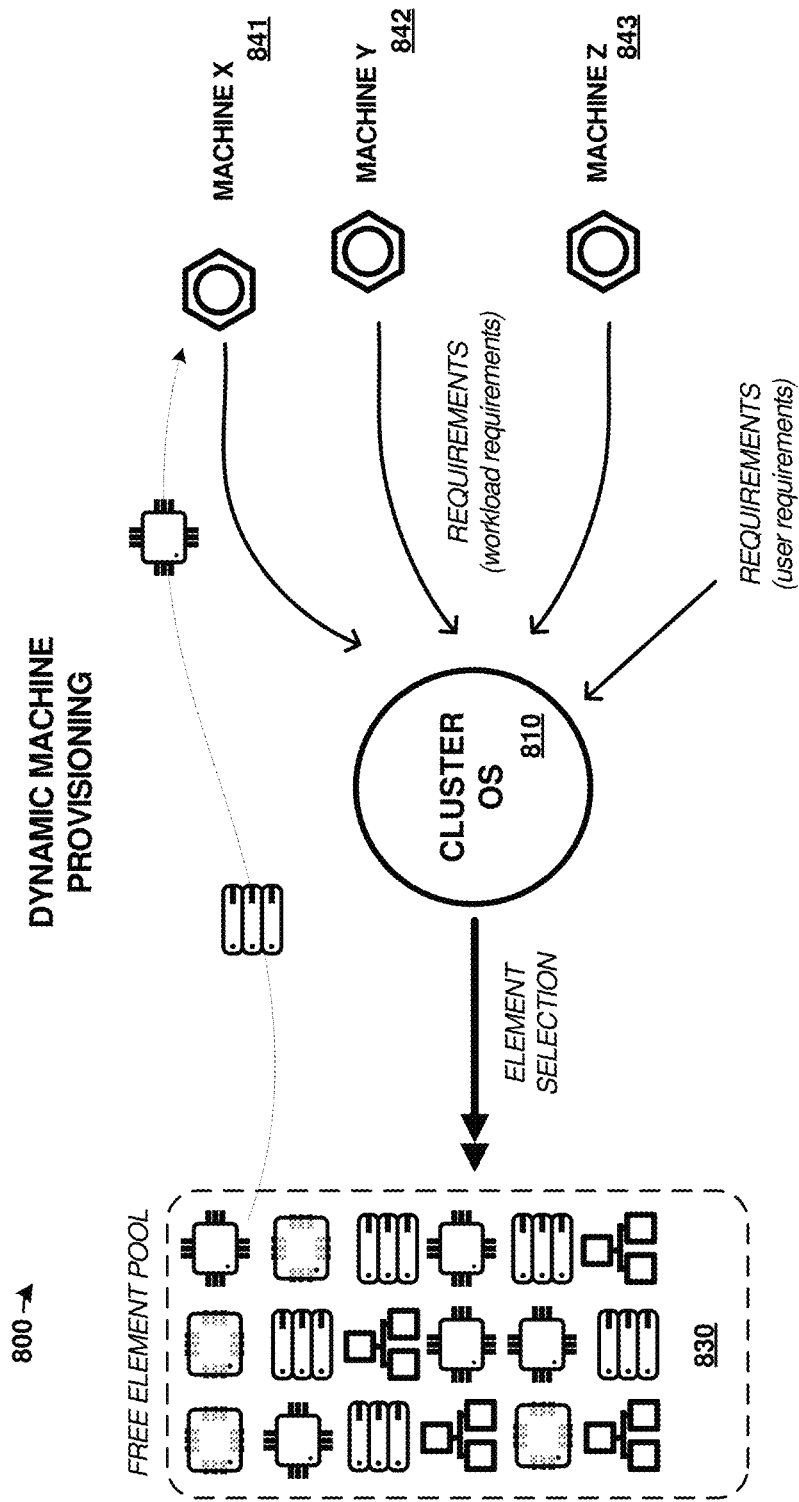
FIG. 8 illustrates example cluster management implementations.
Figure 9:
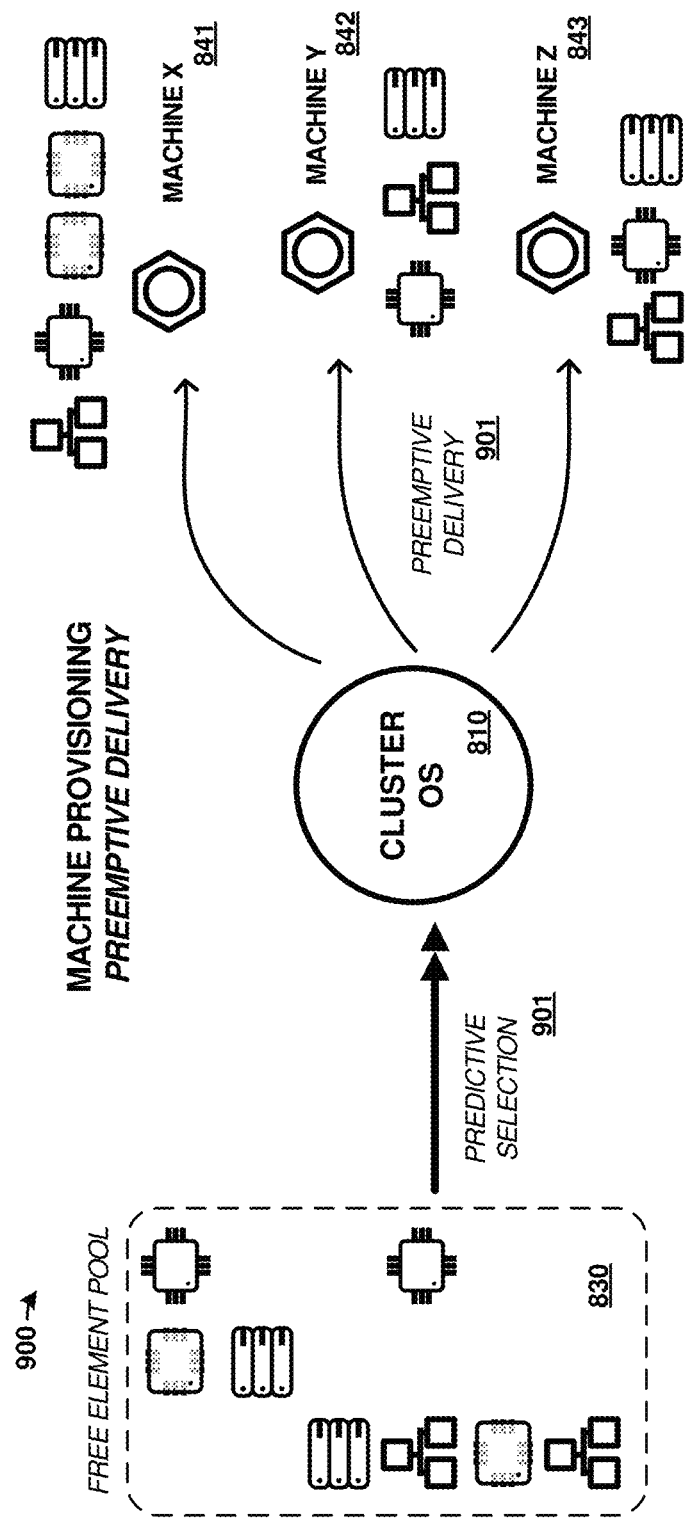
FIG. 9 illustrates example cluster management implementations.

FIG. 8 illustrates disaggregated infrastructure during a dynamic machine provisioning configuration 800. FIG. 9 illustrates disaggregated infrastructure during a preemptive allocation configuration 900. FIGS. 8-9 illustrate operation during dynamic "bare metal" orchestration. Several machines are shown, each with associated machines comprised of elements/resources. The clusters are electrically isolated using the PCIe fabric, and can dynamically pull elements/resources from a pool of free elements. Thus, a physical enclosure, such as a rackmount enclosure system, can have a predetermined number of elements (i.e. several processors, network interfaces, GPUs, and storage drives) and these elements can be allocated dynamically among any number of clusters and associated compute units/machines.

For example, a management OS 810 run on a management processor can allocate the free elements from free pool 830 to particular machines (841-842) pre-emptively or on-demand based on user requirements or current workload requirements. The management OS 810 can make predictive selections 901 based at least on the resource needs of various machines and clusters of machines based on current and past performance, workloads, or activities of those machines and clusters. When the management OS determines that resources will be needed, the management OS can predictively (901) and pre-emptively assign (902) free resources 830 to those machines. This provides on-demand additional resources for machines on-the-fly. As machines increase workloads, additional resources can automatically be provided. Likewise, as machines decrease workloads, excess resources can be placed back into the free element pool for use by other machines. Thus, efficient use of CPU, storage, GPU, and network interface resources can be achieved, especially when the physical systems support more than one cluster. Each cluster can have on-demand processing, network, GPU, and storage capacity and shed excess capacity on-the-fly.

In FIG. 9, machine 'x' 841 is shown with one network interface resource, one CPU resource, two GPU resources, and one or more storage resources. Machine 'y' and machine 'z' are both shown having been assigned one CPU resource, one network interface resource, and one or more storage resources.

Figure 10:
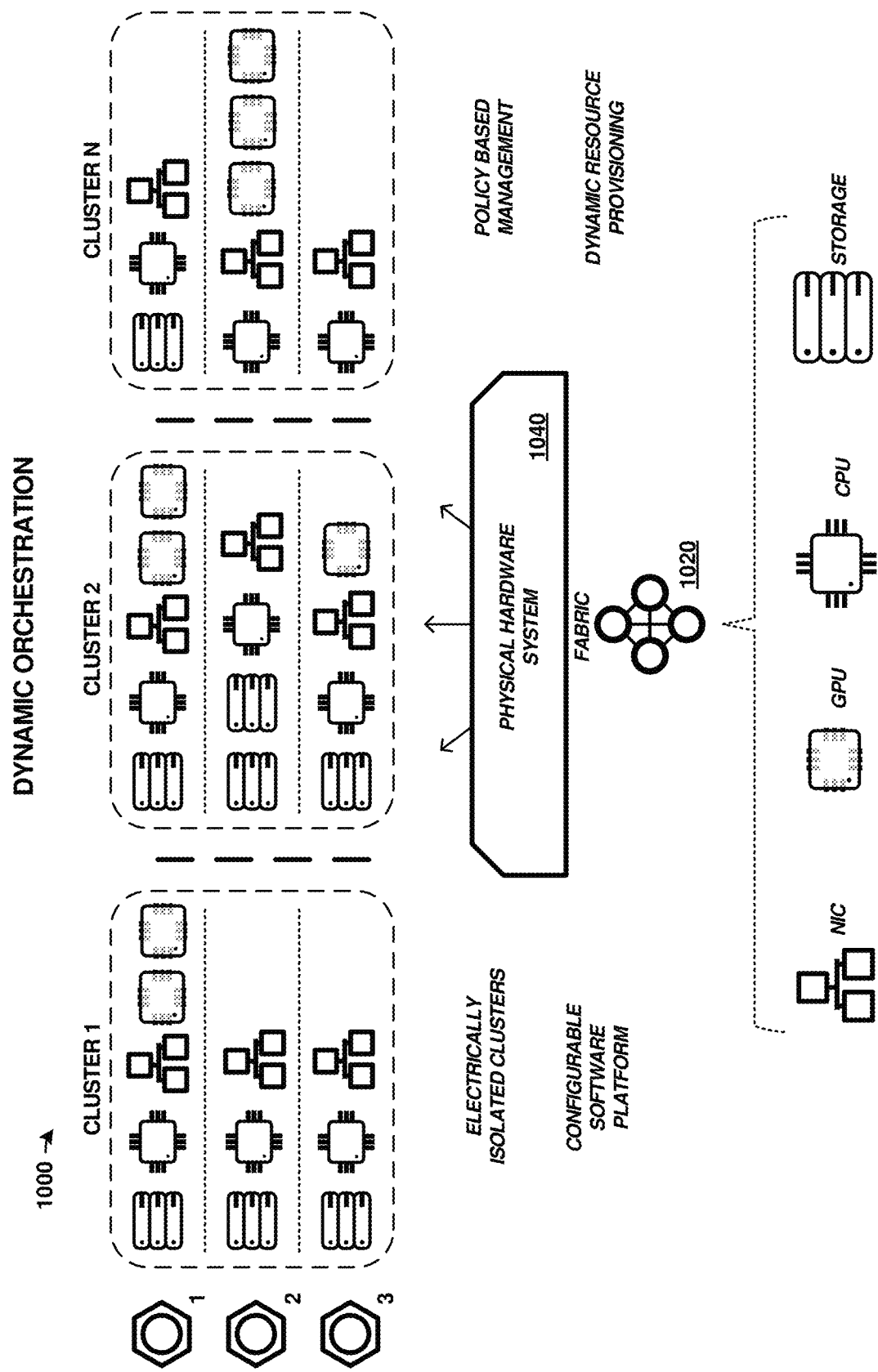
FIG. 10 illustrates example cluster management implementations.

FIG. 10 illustrates clustered operation during dynamic "bare metal" orchestration. Several machines are shown for each cluster, with associated machines comprised of physical elements/resources 1040 such as CPUs, GPUs, NICs, and storage drives. The clusters are electrically isolated using PCIe fabric 1020, and a management system can dynamically pull elements/resources from a pool of free elements, such as seen in FIGS. 7-9. Thus, one or more physical enclosures, such as a rack-mounted hardware arrangement, can have many elements (i.e. several processors, network interfaces, GPUs, and storage drives) and these elements can be allocated dynamically among any number of clusters and associated compute units/machines.

FIG. 10 illustrates three example clusters, 1–N, with any number of clusters possible depending upon the availability of resources to be assigned to machines of the clusters. Although each cluster has three machines, it should be understood that more or less than three machines per cluster can be utilized. Moreover, each machine in each cluster indicates example elements assigned thereto. These assigned elements can change dynamically according to policy based management, user commands, user instructions, preemptive or predictive allocation, idle/spin-down based removal, or other considerations. One or more management services or control processors can be configured to perform this establishment and alteration of machines and clusters using the PCIe fabric as a medium to couple the various elements dynamically.

To provide further control and monitoring of the disaggregated infrastructure examples discussed herein, as well as to provide user control of any associated management services or processors, various user interfaces can be provided. FIGS. 11-14 present several example user interface elements for control of one or more clusters, machines, and resources of a disaggregated infrastructure.

FIGS. 11-14 detail various graphical user interfaces and methods of operating graphical user interface systems to a disaggregated computing platform. In FIGS. 11-14, the user interfaces can receive user input over cluster interface portions to establish compute clusters comprising compute units for executing user software thereon. The user interfaces can receive further user input to add physical resources into one or more compute units that are coupled over a PCIe fabric and associate the one or more compute units to associated ones of the compute clusters. The physical resources include processing resources, storage resources, graphics processing resources, and network interface resources. Responsive to formation of the compute units and the compute clusters among the PCIe fabric, the user interfaces can present indications of the formation of the physical resources into the compute units and the compute units into the compute clusters, and present telemetry data related to operation of at least the compute units.

Figure 11:
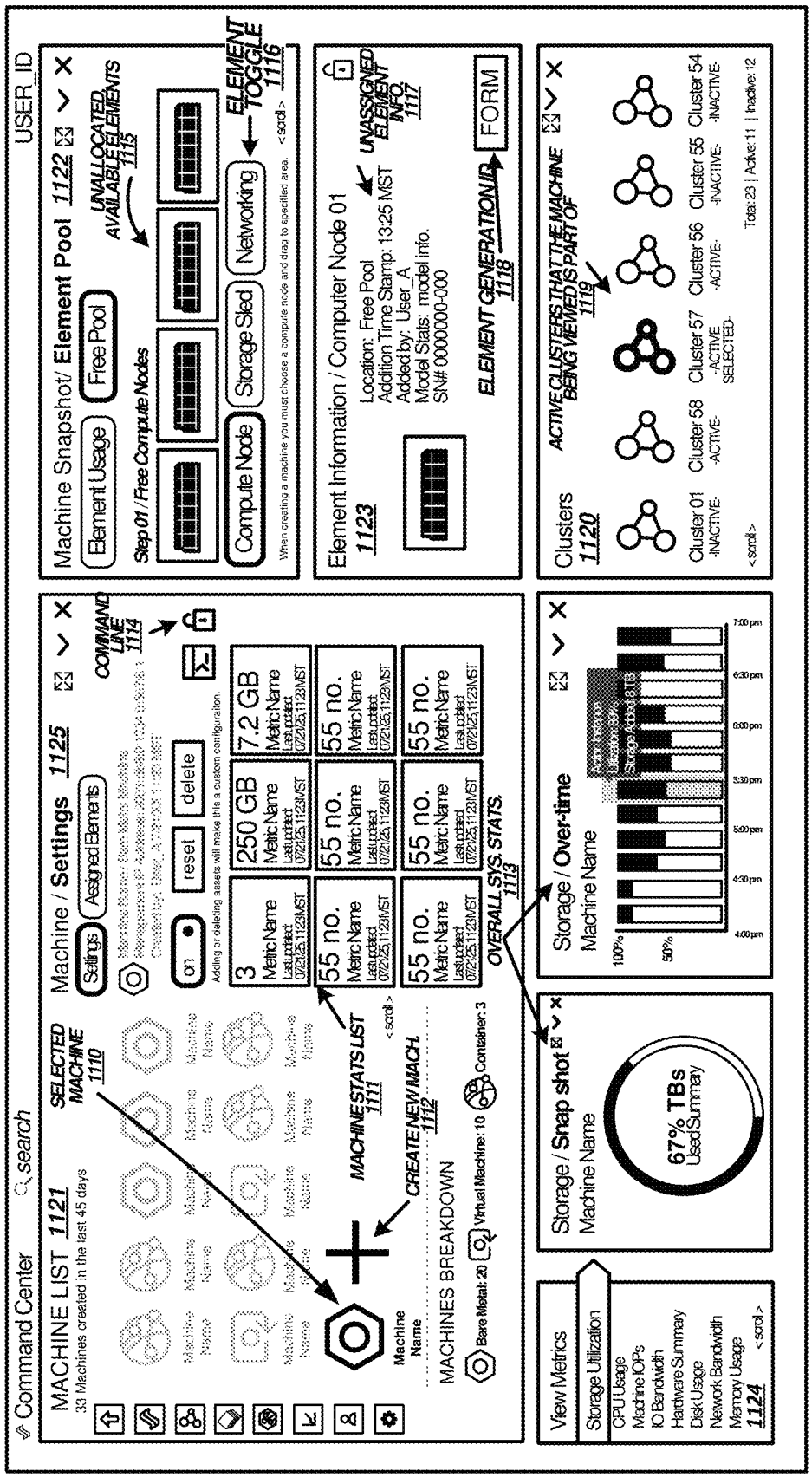
FIG. 11 illustrates a cluster management graphical user interface in an implementation.

Turning now to a first example, FIG. 11 illustrates one implementation of a graphical user interface (GUI) to the computing services provided by a management processor/OS. FIG. 11 illustrates an example "home screen" 1100 for managing clusters and machines within clusters. The GUI provides a graphical representation of the operational status of the clusters, and users can select among various clusters in a first portion of the GUI. Once a cluster is selected (1120), properties and status for that cluster are presented in another portion of the GUI (1121). Various elements (processing, networking, storage) are illustrated graphically and arranged according to present assignment to particular machines. A machine can be selected and further status and properties can be presented to the user (1125). Real-time statistics and historical usage statistics can be presented for any of the elements, machines, or clusters. Metrics can be selected among which can prompt the GUI to present graphical information related to the selected metrics (1124). Free elements/resources are indicated in the GUI (1122), and these can be assigned to existing or new machines and clusters by user action, such as dragging resources/elements into a pool associated with a machine. The user interfaces can comprise graphical user interfaces and command line (1114) interfaces, and these can be provided over displays, network links, packet links, web interfaces, terminal consoles, or other interfaces.

In one particular example, cluster interface portion 1120 of a graphical user interface 1100 is provided in FIG. 11. This cluster interface portion can show current clusters and identification information for those clusters. Users can select one of the clusters for further details and configuration options. Once selected, an 'active' cluster 1119 is shown in further portions of the graphical user interface. One further user interface portion is computing block portion 1121 that includes a machine listing as well as indicates properties and status of the associated machines. The machine listing presents a canvas that includes one or more currently assigned machines for a cluster. These machines can be represented by various icons which might be customized according to a role or status. A currently selected machine 1110 can have further details and specifications presented in the machine statistics list 1111. This statistics list might include current workload information, capabilities, identification information, or other information related to current status or operation of the selected machine.

Figure 12:
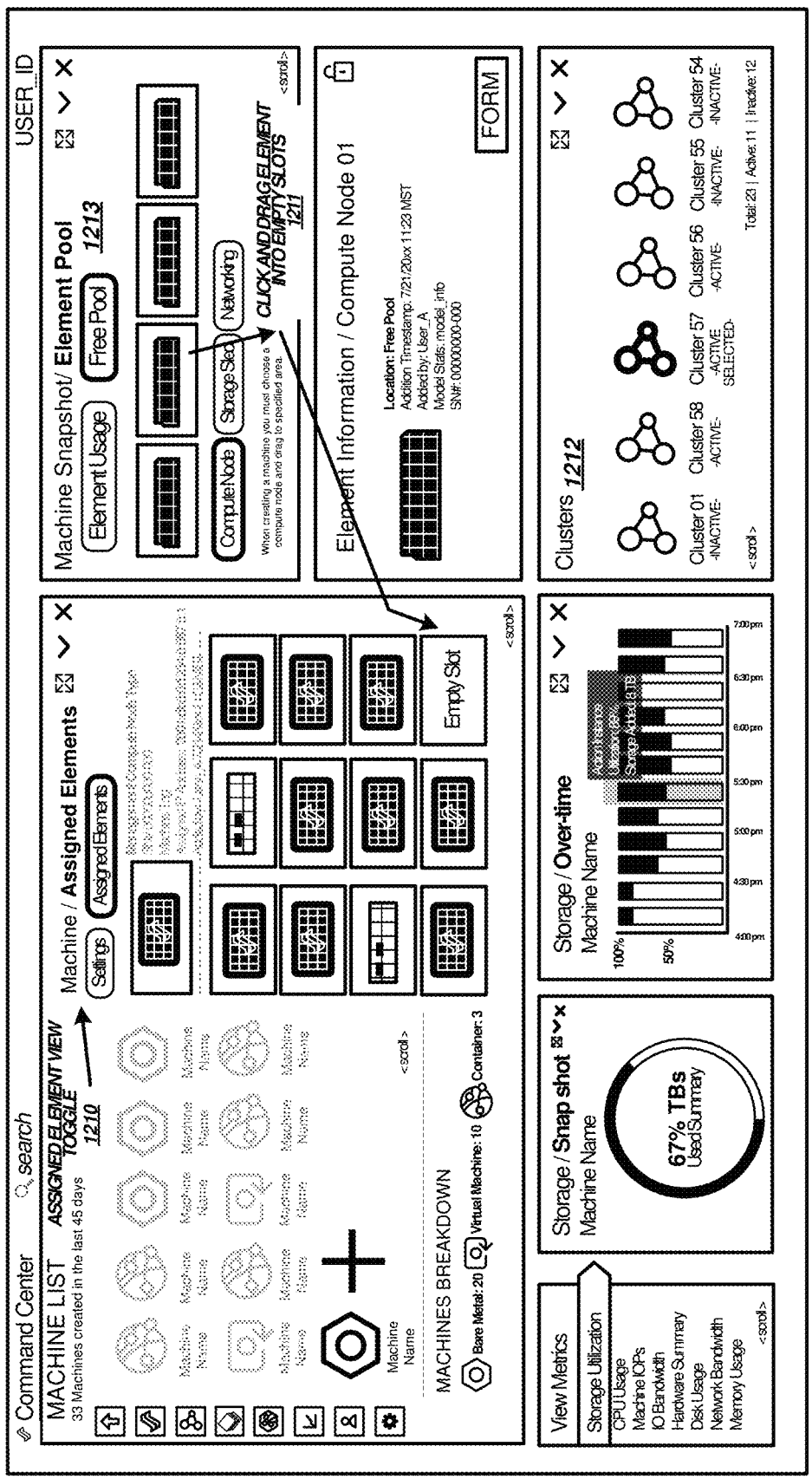
FIG. 12 illustrates a cluster management graphical user interface in an implementation.

Moreover, a user can be presented via computing block portion 1121 with an option 1112 to add more machines into the cluster. FIG. 12 discusses this operation in more detail. In FIG. 11, unallocated elements 1115 can be viewed in an element pool 1122 with element type toggle 1116 switching among the various types of elements (i.e. CPU, GPU, NIC, storage) that are currently unassigned into a machine. Details of a selected unallocated element 1117 is provided in view 1123 to allow users to view statuses, statistics, or other information on the unallocated element presently selected. Element generation identification (ID) 1118 can allow a user to alter properties, names, or other information related to the presently selected unallocated element.

Various telemetry data can be provided by monitoring interface portion 1133 which via menu 1124 can be used to view various properties, status, operational information, and other information related to overall clusters, machines, management services or processors, and other components. Monitoring interface portion 1133, among other portions, can present this telemetry data related to operation of at least the machines/compute units, and the telemetry data typically indicates at least usage levels among the physical resources assigned to the compute units, and can further indicate a quantity of free physical resources ready for assignment to one or more compute units (see portion 1311 in FIG. 13).

The graphical user interface can be configured to receive user defined targets describing usage requirements for one or more compute units, and these user defined targets can be processes to determine ones of the physical resources to include in at least one associated machine to meet the usage requirements. The associated physical resources can be indicated to a management service/processor for implementation of the one or more compute units using logical partitioning among the PCIe fabric. Moreover, the graphical user interface can be configured to receive user thresholds related to operation of the compute units, wherein the user thresholds indicate activity levels of the compute units for which to add one or more physical resources into ones of the compute units that exceed the user thresholds. Upper thresholds can be received from users that indicate when to add further resources into a machine or into a cluster. The thresholds can be based on processor utilization, memory/RAM utilization, storage space utilization, network bandwidth utilization, or other thresholds. Lower thresholds can also be received from users that indicate when to remove resources from a machine or cluster based on lack of the various utilizations indicated above. Timing thresholds or properties can also be received that indicate delays to wait before implementing changes to a machine or cluster.

FIG. 12 illustrates example GUI 1200 presenting operations using the GUI to assign resources/elements to a machine. GUI 1200 can present graphical representations of at least the CPUs, storage elements, GPUs, and the network interface elements for incorporation by the user into a compute unit/machine responsive to associated user input. A user can select a particular machine in the upper left portion (1210) of the GUI after selecting a particular cluster in the lower right portion (1212). New machines can also be created by users, as mentioned in FIG. 11. Free elements from a free element pool are shown in the upper right portion (1213) and these can be clicked and dragged into a slot for a particular machine (1211). Moreover, user input can be received into GUI 1200 comprising user instructions indicating at least one machine for incorporation a target compute cluster for executing user software.

Once the selected element is dragged to a machine, then the management OS can be prompted by a management interface portion of the GUI or GUI system to initiate the process of associating the selected element to the machine and likewise to the cluster. For example, responsive to receiving the user instructions to add a selected element into a machine (or likewise to add a machine into a cluster), the user instructions can be indicated to a management service/processor for implementation of the user instructions to alter logical partitioning among the PCIe fabric in accordance with the user instructions. The associated management processor interprets user selections and sends control information to further portions of the computing system to assign the selected element to the machine/cluster. The PCIe fabric is configured to allow the selected element to communicate with the other elements of the machine/cluster, and any initialization of the selected element itself is performed. Moreover, when user software is to be deployed to a machine or cluster, then the user software can be deployed to the machine or cluster once the management service/process has configured the PCIe fabric accordingly. Other software, such as operating systems, monitoring modules or network driver modules can be deployed as well to the machines or clusters. Also, when virtualized containers, Dockers, or other elements are employed, these can be deployed to the to the machines or clusters. The deployment typically occurs over the PCIe fabric, or over alternatively over sideband interfaces as shown in FIGS. 1-2.

Figure 13:
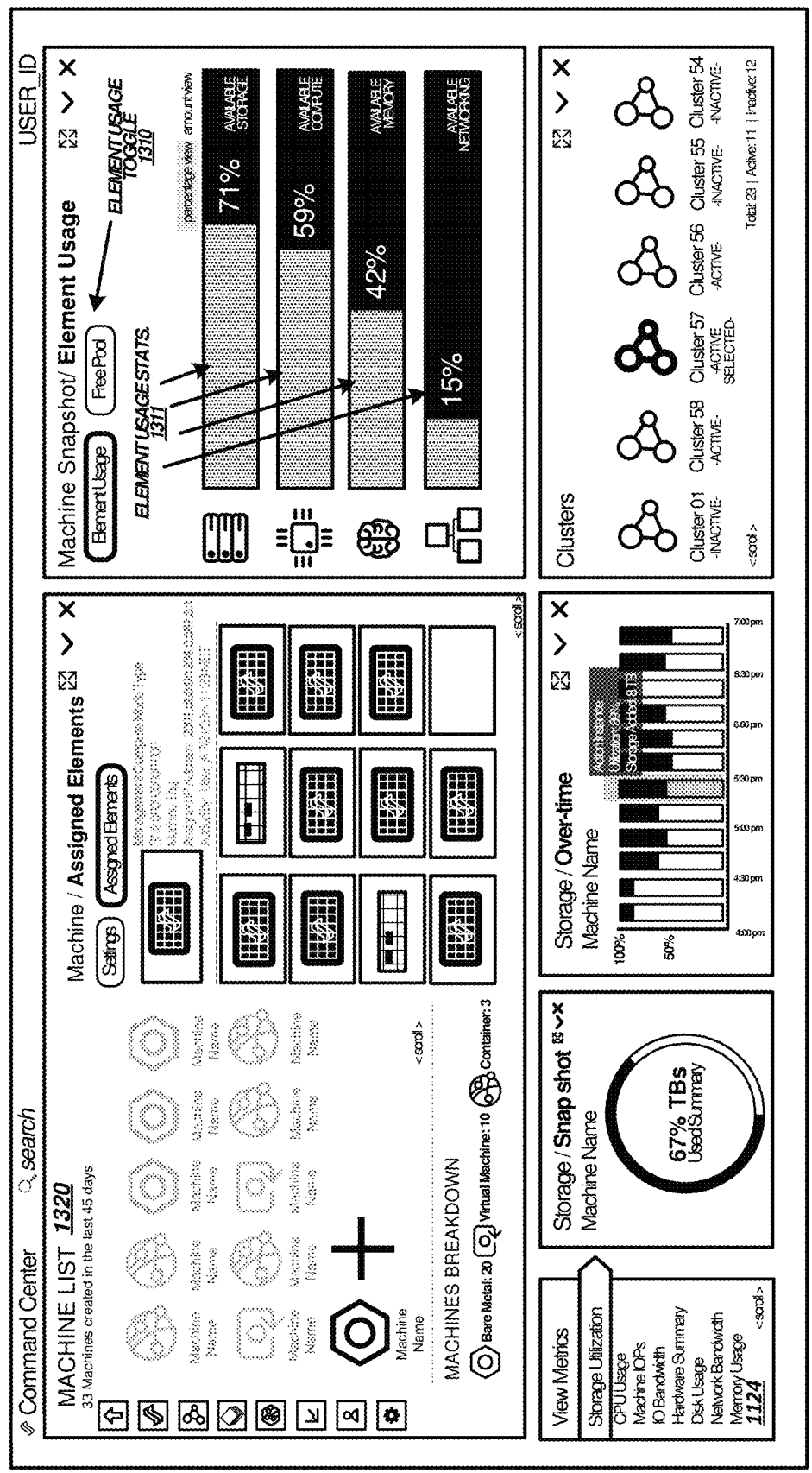
FIG. 13 illustrates a cluster management graphical user interface in an implementation.

FIG. 13 illustrates example GUI 1300 presenting usage statistics for elements of a system, such as provided by a monitoring interface portion. Machines listed in the upper right portion (1320) of the GUI can be selected to indicate the current free pool of elements or a status of currently used elements. In this example, bar graphs (1311) are presented indicating current percentages of allocation of the bare metal assets (elements). These elements include storage, compute/processing, memory/RAM, and networking. Other elements can be included in further examples, such as graphics processing elements. Users can toggle (1310) among the bar graph/statistical view and a view of the elements themselves for assignment (via drag and drop or other user interface techniques) into a machine.

Figure 14:
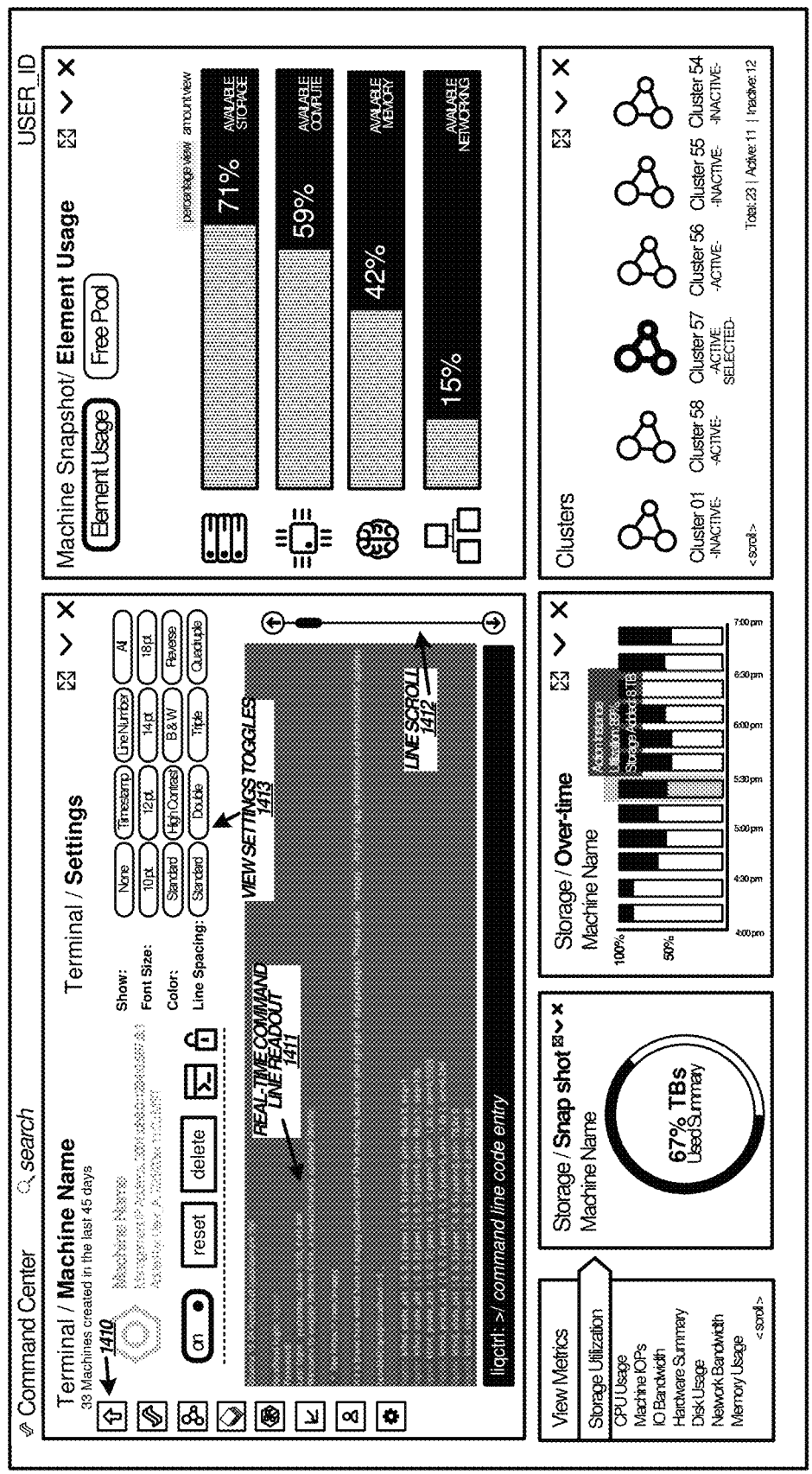
FIG. 14 illustrates a cluster management graphical user interface in an implementation.

FIG. 14 illustrates an example alternative interface within example GUI 1400, namely a command line interface presented in the upper right portion (1411) of the command center main menu 1410. Users can type in commands and instructions for use by the management processor/OS instead of clicking/dragging, or to allow for textual presentation of status and properties of the clusters/machines. Scripting and code entry can be facilitated by the command line interface, such as to script the creation of clusters/machines or to script handling of status information and transfer of the information to various destinations. As with many command line interfaces, line scroll features (1412) are provided to scroll through a history of the command lines. View setting toggles 1411 can also be presented to alter font/typeface size, type, color, spacing, or other view properties for the command line interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A compute unit, comprising:
   a plurality of physical computing components coupled over a Peripheral Component Interconnect Express (PCIe) fabric that is configured to communicatively couple the plurality of physical computing components and form the compute unit using logical partitioning within the PCIe fabric; and
   a software component deployed by a management processor to at least an associated CPU within the compute unit responsive to formation of the compute unit, the software component comprising:
   a monitoring function configured to report telemetry to the management processor related to operation of the compute unit; and
   a driver function configured to emulate operation of at least one among an Ethernet and InfiniBand interface to an operating system of the associated CPU for transfer of communications comprising at least the telemetry to the management processor over the PCIe fabric.

2. The compute unit of claim 1, wherein the driver function is further configured to transfer the communications over the PCIe fabric for delivery to the management processor without processing the communications through a network stack.

3. The compute unit of claim 1, wherein based at least on the logical partitioning, the compute unit has visibility over the PCIe fabric to only the plurality of physical computing components assigned to the compute unit using the logical partitioning within the PCIe fabric, and lacks visibility over the PCIe fabric to other physical computing components that are communicatively coupled over the PCIe fabric.

4. The compute unit of claim 1, wherein the management processor is configured to instruct the PCIe fabric to establish the logical partitioning within the PCIe fabric by at least forming domain-based PCIe segregation among ports of PCIe switches that comprise the PCIe fabric.

5. The compute unit of claim 1, wherein the management processor is configured to instruct the PCIe fabric to establish the logical partitioning within the PCIe fabric by at least forming non-transparent (NT) port-based PCIe segregation among ports of PCIe switches that comprise the PCIe fabric.

6. The compute unit of claim 1, wherein the plurality of physical computing components includes at least the associated CPU and one or more among a storage module, graphics processing unit (GPU), and network interface module.

7. The compute unit of claim 1, wherein the compute unit is a member of a cluster comprising at least one further compute unit coupled over the PCIe fabric and logically isolated on the PCIe fabric from other clusters of a clustered environment.

8. The compute unit of claim 6, comprising:
   responsive to alteration of the logical partitioning by the management processor, the compute unit configured to comprise an altered composition of the plurality of physical computing components within the compute unit.

9. The compute unit of claim 8, wherein the altered composition of the plurality of physical computing components within the compute unit comprises at least one more physical computing component selected among a CPU, storage module, GPU, and network interface module.

10. A method of operating a compute unit, the method comprising:
    forming the compute unit among a plurality of physical computing components coupled over a Peripheral Component Interconnect Express (PCIe) fabric that is configured to communicatively couple the plurality of physical computing components and isolate the compute unit using logical partitioning within the PCIe fabric;

initiating a software component deployed by a management processor to at least an associated CPU within the compute unit responsive to formation of the compute unit;

in a monitoring function of the software component, reporting telemetry to the management processor related to operation of the compute unit; and in a driver function of the software component, emulating operation of at least one among an Ethernet and InfiniBand interface to an operating system of the associated CPU for transfer of communications comprising at least the telemetry to the management processor over the PCIe fabric.

11. The method of claim 10, further comprising:

in the driver function, transferring the communications over the PCIe fabric for delivery to the management processor without processing the communications through a network stack.

12. The method of claim 10, wherein based at least on the logical partitioning, the compute unit has visibility over the PCIe fabric to only the plurality of physical computing components assigned to the compute unit using the logical partitioning within the PCIe fabric, and lacks visibility over the PCIe fabric to other physical computing components that are communicatively coupled over the PCIe fabric.

13. The method of claim 10, wherein the management processor is configured to instruct the PCIe fabric to establish the logical partitioning within the PCIe fabric by at least forming domain-based PCIe segregation among ports of PCIe switches that comprise the PCIe fabric.

14. The method of claim 10, wherein the management processor is configured to instruct the PCIe fabric to establish the logical partitioning within the PCIe fabric by at least forming non-transparent (NT) port-based PCIe segregation among ports of PCIe switches that comprise the PCIe fabric.

15. The method of claim 10, wherein the plurality of physical computing components includes at least the associated CPU and one or more among a storage module, graphics processing unit (GPU), and network interface module.

16. The method of claim 15, wherein responsive to alteration of the logical partitioning by the management processor, the compute unit is configured to comprise an altered composition of the plurality of physical computing components within the compute unit.

17. The method of claim 16, wherein the altered composition of the plurality of physical computing components within the compute unit comprises at least one more physical computing component selected among a CPU, storage module, GPU, and network interface module.

18. A computing apparatus comprising:

one or more computer readable storage media;

a processing system operatively coupled with the one or more computer readable storage media; and program instructions stored on the one or more computer readable storage media, that when executed by the processing system, direct the processing system to at least:

form a compute unit among a plurality of physical computing components coupled over a Peripheral Component Interconnect Express (PCIe) fabric that is configured to communicatively couple the plurality of physical computing components and isolate the compute unit using logical partitioning within the PCIe fabric;

initiate a software component deployed by a management processor to at least an associated CPU within the compute unit responsive to formation of the compute unit;

in a monitoring function of the software component, report telemetry to the management processor related to operation of the compute unit; and in a driver function of the software component, emulate operation of at least one among an Ethernet and InfiniBand interface to an operating system of the associated CPU for transfer of communications comprising at least the telemetry to the management processor over the PCIe fabric without processing the communications through a network stack.

19. The computing apparatus of claim 18, wherein based at least on the logical partitioning, the compute unit has visibility over the PCIe fabric to only the plurality of physical computing components assigned to the compute unit using the logical partitioning within the PCIe fabric, and lacks visibility over the PCIe fabric to other physical computing components that are communicatively coupled over the PCIe fabric.

20. The computing apparatus of claim 18, wherein the plurality of physical computing components includes at least the associated CPU and one or more among a storage module, graphics processing unit (GPU), and network interface module.

* * * * *